United States Patent
Zamer

(10) Patent No.: US 11,893,609 B2
(45) Date of Patent: *Feb. 6, 2024

(54) SERVICE EXPERIENCE SCORE SYSTEM

(71) Applicant: eBay Inc., San Jose, CA (US)

(72) Inventor: Kamal Zamer, Austin, TX (US)

(73) Assignee: EBAY INC., San Jose, CA (US)

( * ) Notice: Subject to any disclaimer, the term of this patent is extended or adjusted under 35 U.S.C. 154(b) by 76 days.

This patent is subject to a terminal disclaimer.

(21) Appl. No.: 17/592,626

(22) Filed: Feb. 4, 2022

(65) Prior Publication Data
US 2022/0156807 A1    May 19, 2022

Related U.S. Application Data

(63) Continuation of application No. 14/206,808, filed on Mar. 12, 2014, now Pat. No. 11,257,129.

(51) Int. Cl.
*G06Q 30/02* (2023.01)
*G06Q 30/0282* (2023.01)
*H04W 4/029* (2018.01)

(52) U.S. Cl.
CPC ........ *G06Q 30/0282* (2013.01); *H04W 4/029* (2018.02)

(58) Field of Classification Search
None
See application file for complete search history.

(56) References Cited

U.S. PATENT DOCUMENTS

| | | | |
|---|---|---|---|
| 8,818,403 B1 * | 8/2014 | Gauba | H04B 17/318 |
| | | | 455/418 |
| 11,257,129 B2 | 2/2022 | Zamer | |
| 2003/0200147 A1 * | 10/2003 | Sabongi | G06Q 30/02 |
| | | | 705/15 |
| 2004/0224703 A1 * | 11/2004 | Takaki | H04W 4/021 |
| | | | 455/457 |

(Continued)

OTHER PUBLICATIONS

Allurwar et al. (Allurwar et al., Beacon for Proximity Target Marketing, International Journal of Engineering and Computer Science, ISSN: 2319-7242, vol. 5 Issue 5, May 2016, pp. 16359-16364).*

(Continued)

*Primary Examiner* — Matthew D Henry
(74) *Attorney, Agent, or Firm* — SCHWEGMAN LUNDBERG & WOESSNER, P.A.

(57) ABSTRACT

Systems and methods for providing a service experience score at a merchant physical location include a system provider device that determines, through communication at least one of a plurality of beacon devices located at the merchant physical location and a user device, a start of a user service experience. The system provider device also determines, through the at least one of the plurality of beacon devices and the user device, an end of the user service experience. A service experience score that is based at least partly on the start of the user service experience and the end of the user service experience is generated. The service experience score is stored in a database in association with a merchant that is associated with the merchant physical location. Subsets of the service experience score may be associated with different locations of the merchant physical location.

20 Claims, 24 Drawing Sheets

(56) References Cited

U.S. PATENT DOCUMENTS

| | | | | |
|---|---|---|---|---|
| 2007/0112729 | A1* | 5/2007 | Wiseman | G06Q 30/0623 |
| 2009/0279427 | A1* | 11/2009 | Ji | H04W 74/0816 370/230 |
| 2009/0325595 | A1* | 12/2009 | Farris | G01C 21/206 455/456.1 |
| 2010/0198626 | A1* | 8/2010 | Cho | G06Q 30/02 705/306 |
| 2010/0267387 | A1* | 10/2010 | Stephens | H04W 36/22 455/436 |
| 2011/0096675 | A1* | 4/2011 | Li | H04B 17/382 370/252 |
| 2011/0119068 | A1* | 5/2011 | Hockett | G01C 21/343 715/764 |
| 2013/0030931 | A1* | 1/2013 | Moshfeghi | H04W 4/027 705/16 |
| 2013/0031506 | A1* | 1/2013 | Diaz | G06Q 50/12 715/781 |
| 2013/0198281 | A1* | 8/2013 | Scuba | H04L 41/0893 709/204 |
| 2013/0231974 | A1* | 9/2013 | Harris | G06Q 30/0201 705/7.29 |
| 2013/0321398 | A1* | 12/2013 | Howard | G06T 17/20 345/419 |
| 2013/0326425 | A1* | 12/2013 | Forstall | G01C 21/3878 715/851 |
| 2014/0024375 | A1* | 1/2014 | Fitzpatrick | H04W 36/30 455/436 |
| 2014/0108081 | A1* | 4/2014 | Burns | G06Q 10/06 705/7.15 |
| 2014/0149573 | A1* | 5/2014 | Tofighbakhsh | H04W 28/02 709/224 |
| 2014/0222512 | A1* | 8/2014 | Pace | G06F 3/0484 705/7.32 |
| 2014/0274094 | A1* | 9/2014 | Abdelmonem | H04W 40/16 455/452.1 |
| 2014/0337871 | A1* | 11/2014 | Garcia De Blas | H04N 21/4667 725/14 |
| 2015/0019651 | A1* | 1/2015 | Kazi | H04L 51/52 709/205 |
| 2015/0103685 | A1* | 4/2015 | Butchko | H04L 43/0888 455/67.14 |
| 2015/0199742 | A1* | 7/2015 | Abhyanker | G06Q 30/0631 705/26.7 |
| 2015/0262265 | A1 | 9/2015 | Zamer | |
| 2015/0369623 | A1* | 12/2015 | Blumenberg | G06T 3/40 701/532 |

OTHER PUBLICATIONS

U.S. Appl. No. 14/206,808, filed Mar. 12, 2014, Patented, U.S. Pat. No. 11,257,129.

Bautin et al. (International Sentiment Analysis for News and Blogs 2008, Assoc. Advancement of Artificial Intelligence pp. 19-26).

Final Office Action received for U.S. Appl. No. 14/206,808, dated Dec. 12, 2016, 32 pages.

Final Office Action received for U.S. Appl. No. 14/206,808, dated Feb. 16, 2021, 24 pages.

Final Office Action received for U.S. Appl. No. 14/206,808, dated Jan. 26, 2018, 35 pages.

Non-Final Office Action received for U.S. Appl. No. 14/206,808, dated Aug. 6, 2020, 21 pages.

Non-Final Office Action received for U.S. Appl. No. 14/206,808, dated Aug. 23, 2016, 24 pages.

Non-Final Office Action received for U.S. Appl. No. 14/206,808, dated Sep. 19, 2017, 28 pages.

Notice of Allowance received for U.S. Appl. No. 14/206,808, dated Oct. 7, 2021, 12 pages.

Piamrat et al. (QoE-based Network Selection for Multimedia Users in IEE 802.11 Wireless Networks, 2008, pp. 388-394).

"U.S. Appl. No. 14/206,808, Preliminary Amendment filed Apr. 29, 2014", 3 pgs.

"U.S. Appl. No. 14/206,808, Examiner Interview Summary dated Nov. 23, 2016", 3 pgs.

"U.S. Appl. No. 14/206,808, Examiner Interview Summary dated Jan. 18, 2017", 3 pgs.

"U.S. Appl. No. 14/206,808, Advisory Action dated Jan. 27, 2017", 3 pgs.

"U.S. Appl. No. 14/206,808, Examiner Interview Summary dated Dec. 20, 2017", 3 pgs.

"U.S. Appl. No. 14/206,808, Applicant's Summary of Examiner Interview filed Jan. 22, 2018", 1 pg.

"U.S. Appl. No. 14/206,808, Pre-Appeal Brief Request filed Apr. 26, 2018", 5 pgs.

"U.S. Appl. No. 14/206,808, Decision on Pre-Appeal Brief Request mailed Aug. 3, 2018", 2 pgs.

"U.S. Appl. No. 14/206,808, Appeal Brief filed Sep. 25, 2018", 30 pgs.

"U.S. Appl. No. 14/206,808, Examiner's Answer to Appeal Brief dated Nov. 21, 2018", 16 pgs.

"U.S. Appl. No. 14/206,808, Reply Brief filed Jan. 22, 2019", 12 pgs.

"U.S. Appl. No. 14/206,808, Examiner Interview Summary dated Jun. 14, 2021", 2 pgs.

"U.S. Appl. No. 14/206,808, 312 Amendment filed Jan. 6, 2022", 12 pgs.

\* cited by examiner

SERVICE EXPERIENCE SCORE SYSTEM

CROSS-REFERENCE TO RELATED APPLICATIONS

This application is a continuation of U.S. patent application Ser. No. 14/206,808 by Kamal Zamer, entitled "Service Experience Score System," filed Mar. 12, 2014, which is hereby incorporated by reference herein in its entirety.

BACKGROUND OF THE INVENTION

Field of the Invention

The present disclosure generally relates to merchant physical locations, and more particularly to a service experience score system that quantifies customer service experiences at merchant physical locations.

Related Art

More and more consumers are purchasing items and services over electronic networks such as, for example, the Internet. Consumers routinely purchase products and services from merchants and individuals alike. The transactions may take place directly between a conventional or on-line merchant or retailer and the consumer, and payment is typically made by entering credit card or other financial information. Transactions may also take place with the aid of an on-line or mobile payment service provider such as, for example, PayPal, Inc. of San Jose, Calif. Such payment service providers can make transactions easier and safer for the parties involved. Purchasing with the assistance of a payment service provider from the convenience of virtually anywhere using a mobile device is one main reason why on-line and mobile purchases are growing very quickly.

Some payment service providers provide online and mobile payment services for merchants with merchant physical locations and their customers in order to allow the customers to make purchases from the merchants at the merchant physical locations. When deciding upon a particular merchant physical location (e.g., a restaurant) to visit and make purchases, customers may wish to make their decision based on how long the service experience at the merchant physical location will last. Conventionally, merchants sometimes attempt to provide customers with an estimated wait time at their merchant physical location that may be based, for example, on a total number of customers currently waiting for service, or a current position in a line. Other conventional systems involve merchants issuing numbers to waiting customers, which may be used in conjunction with a graphic display indicating a number of the customer that is currently being served, which allows customers to numerically visualize their place in queue. However, such methods and devices for providing a customer with an expected wait time are often inaccurate and at best provide only a very rough estimate of how long it will take a customer to receive service at the merchant physical location. Furthermore, such conventional estimated wait times for a merchant physical location, regardless of their accuracy, only provide estimates of a time until a customer is seated or until it is the customer's turn to receive a service, and do not take into account wait times for other aspects of service at a particular merchant physical location.

Thus, there is a need for a service experience score system that accurately reflects the time it takes for a merchant to perform one or more service actions.

BRIEF DESCRIPTION OF THE DRAWINGS

FIG. 6l is a schematic view illustrating an embodiment of a map of the merchant physical location of FIG. 1 illustrating a first method for displaying service experience scores;

Figure 1:
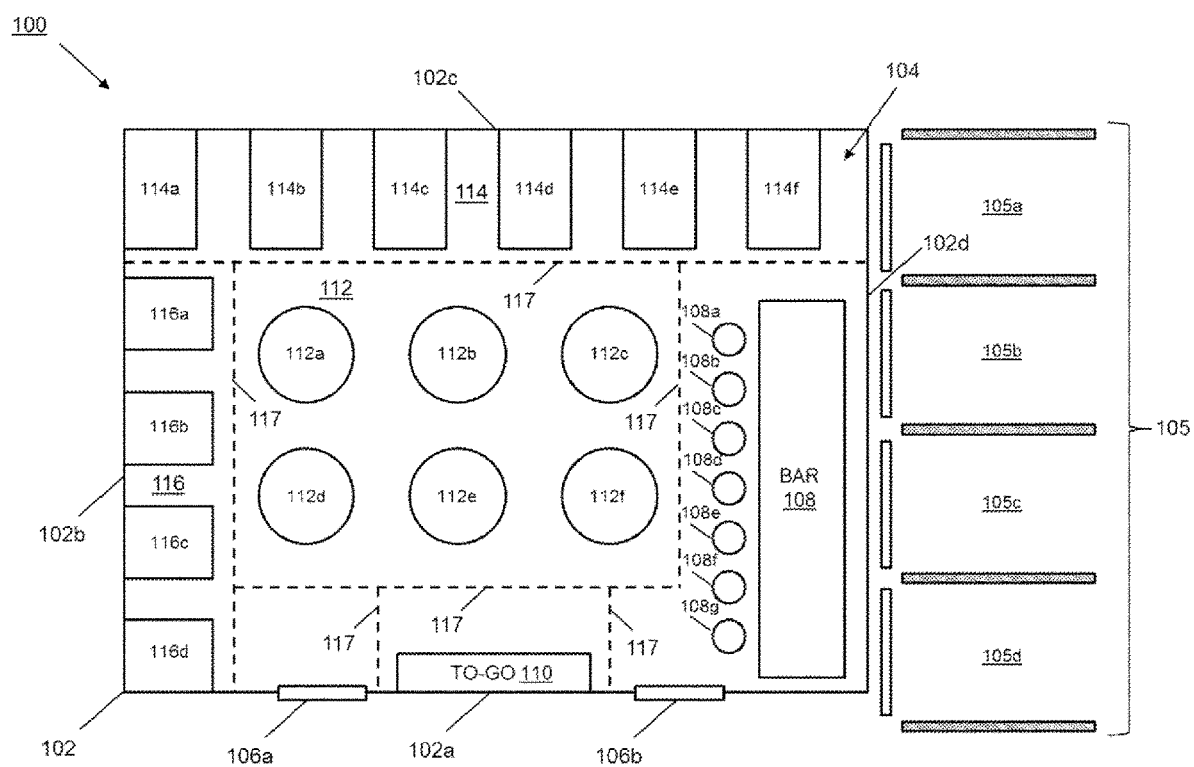
FIG. 1 is a schematic view illustrating an embodiment of a merchant physical location.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION OF THE INVENTION

The present disclosure provides a system and method for providing a service experience score for a merchant physical location. A plurality of beacon devices provided at the merchant physical location may be configured to communicate with customer devices around and throughout the merchant physical location during customer visits to the merchant physical location. A system provider device communicating with a user device through at least one of a plurality of beacon devices may then determine a start of a user service experience. For example, the system provider device may communicate with the user device of a customer entering the merchant physical location and thus determine such an event to be the start of the user experience (e.g., a visit to the merchant physical location). The system provider device also communicates with the user device through the at least one of the plurality of beacon devices to determine an end of the user service experience. For example, the system provider device may communicate with the user device of a customer paying a bill or leaving the merchant physical location and thus determine such an event to be the end of the user experience (e.g., the visit to the merchant physical location). A service experience score is then generated by the system provider device that is based at least partly on the start of the user service experience and the end of the user service experience. During the customer visit to the merchant physical location, one or more of a plurality of events (e.g., service events) may occur between the start and end of the user service experience, and such events may also be used to generate the service experience score. The generated service experience score is stored in a database in association with a merchant that is associated with the merchant physical location. The generated and stored user service experience scores from a plurality of different customers may be used to provide any customer with a breadth of information regarding a possible visit to the merchant physical location, including an overall time that may be required for their visit to the merchant physical location, as well as a variety of other expected service times during a service experience as discussed below. Service experience scores and related information may also be provided to the merchant to enable the merchant to leverage that information to determine the level of service they are providing, and possibly correct any deficiencies in that service.

Referring now to FIG. 1, an embodiment of a merchant physical location 100 is illustrated. The merchant physical location 100 includes a merchant building 102 having a plurality of walls 102a, 102b, 102c, and 102d that define a merchant physical location interior 104 that, in the embodiments illustrated and discussed below, is utilized as a restaurant. However, one of skill in the art in possession of the present disclosure will recognize that the service experience score system described herein may be utilized with virtually any merchant physical location such as, for example, a department/grocery store, a pharmacy, a movie theater, a theme park, a sports stadium, and/or a variety of other merchant physical locations known in the art. The wall 102a includes a pair of doors 106a and 106b (e.g., "entrance" and "exit" doors in the illustrated embodiment).

In an embodiment, the merchant physical location interior 104 of the merchant physical location 100 includes a plurality of areas. For example, as discussed above, in the embodiments discussed below the merchant physical location 100 is a restaurant and the merchant physical location interior 104 includes a bar area 108, a to-go area 110, a table seating area 112, a large booth seating area 114, and a small booth seating area 116. The bar area 108 includes a plurality of barstools 108a, 108b, 108c, 108d, 108e, 108f, and 108g. The table seating area 112 includes a plurality of tables 112a, 112b, 112c, 112d, 112e, and 112f. The large booth seating area 114 includes a plurality of booths 114a, 114b, 114c, 114d, 114e, and 114f. The small booth seating area 116 includes a plurality of booths 116a, 116b, 116c, and 116d. For purposes of illustration, each of the above-mentioned restaurant areas are demarcated with dashed lines 117 as shown in FIG. 1. Additionally, the merchant physical location 100 includes a parking area 105 having a plurality of parking spaces 105a, 105b, 105c, and 105d. While an example of a restaurant is provided, one of skill in the art will recognize that any variety of different areas in any merchant physical location will fall within the scope of the present disclosure. One of skill in the art will appreciate that, depending on where a customer is seated within the merchant physical location interior 104, service wait times may vary (e.g., a customer seated in the bar area 108 or the to-go area 110 may receive faster service than customers seated in one of the other areas of the merchant physical location). Thus, while the generation of the service experience score is illustrated and discussed below as being associated with the table 112e, service experience scores may be associated with any area or sub-area within the merchant physical location 100 (e.g., with the booths, bar area, barstools, to-go area, etc.) in a similar manner.

Figure 2:
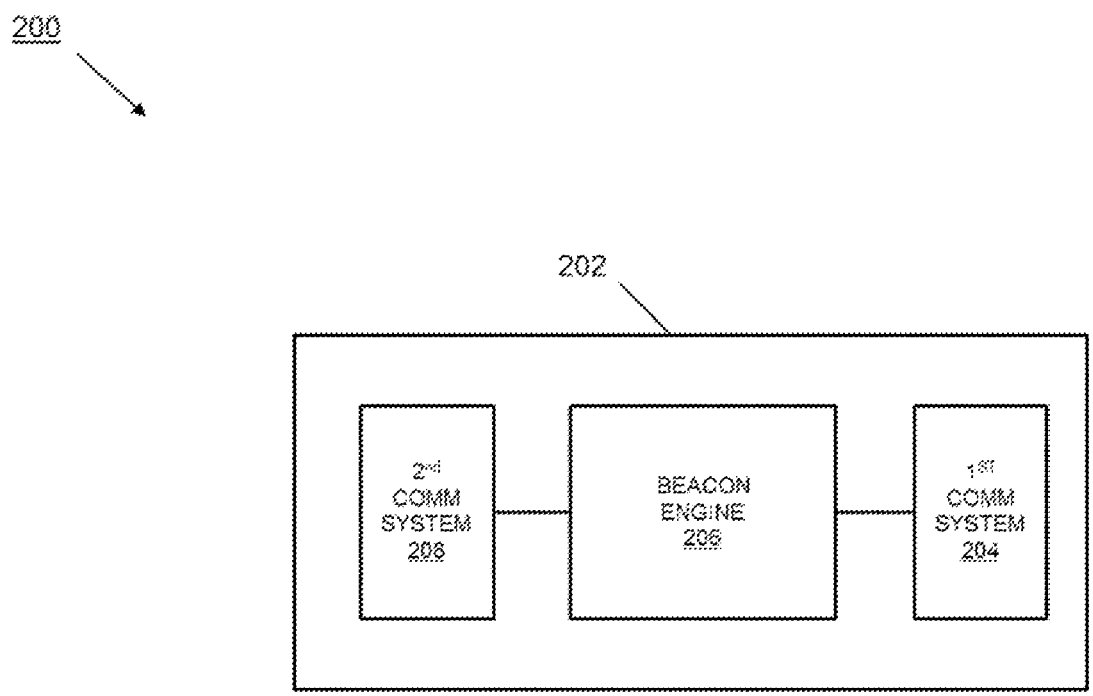
FIG. 2 is a schematic view illustrating an embodiment of a beacon device.

Referring now to FIG. 2, an embodiment of a beacon device 200 is illustrated. The beacon device 200 includes a chassis that houses a first communications system 204 such as, for example, a Wifi communications system. The first communications system 204 is coupled to a beacon engine 206 that may be provided by instruction on a memory system (not illustrated) in the beacon device 200 that, when executed by a processing system (not illustrated) in the beacon device 200, causes the processing system to perform the functions of the beacon device 200 discussed below. The beacon engine 206 is coupled to a second communication system 208 such as, for example, a Bluetooth® Low Energy (BLE) communication system. The beacon engine 206 may be configured to receive any of a variety of sensor signals through the second communication system 208 and transmit those sensor signals using the first communication system 204. While a few examples of communications components in the beacon device 200 have been described, one of skill in the art will recognize that other communications devices, as well as other components that have been omitted for clarity of discussion and illustrated, may be included in the beacon device 200 and will fall within the scope of the present disclosure. One of skill in the art will recognize that the components described above allow for the beacon device to be provided in a relatively small form factor such that it may be placed inconspicuously almost anywhere. As such, the chassis 202 of the beacon device 200 may include any of a variety of features that allow for the coupling of the beacon device to any part of a merchant physical location 100, discussed below.

Figure 3A:
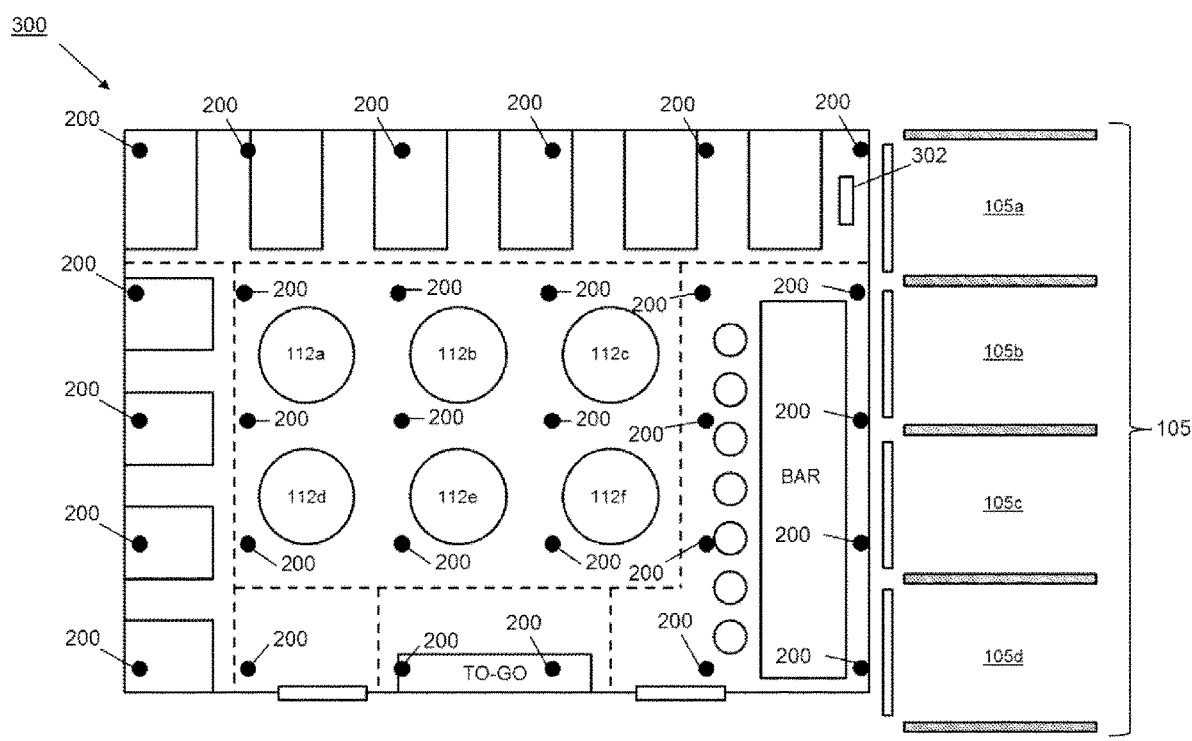
FIG. 3a is a schematic view illustrating an embodiment of a service experience score system that includes a plurality of the beacon devices of FIG. 2 in the merchant physical location of FIG. 1.
Figure 3B:
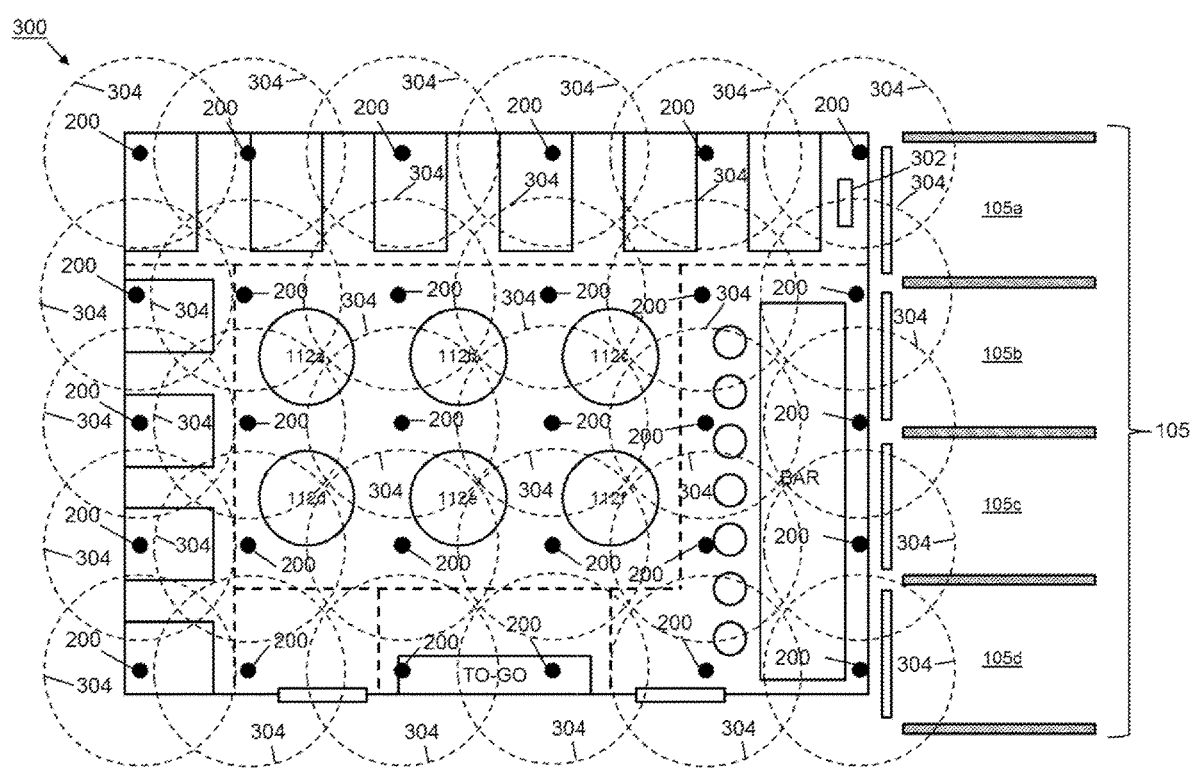
FIG. 3b is a schematic view illustrating an embodiment of the service experience score system of FIG. 3a with the beacon devices providing communication areas.

Referring now to FIGS. 3a and 3b, an embodiment of a service experience score system 300 is illustrated. As illustrated in FIG. 3a, the service experience score system 300 is provided by positioning a plurality of the beacon devices 200, discussed above with reference to FIG. 2, in and around the merchant physical location 100, discussed above with reference to FIG. 1. As discussed above, the beacon devices 200 may be sized such that they may be inconspicuously positioned virtually anywhere in or around the merchant physical location 100. For example, the beacon devices 200 may be positioned on the ceiling within various areas of the merchant physical location interior 104 including within the bar area 108, the to-go area 110, the table seating area 112, the large booth seating area 114, the small booth seating area 116, and/or in any other part of the merchant physical location 100. Each of the beacon devices 200 in the service experience score system 300 may be configured to wirelessly communicate, via its first communications system 204, with a merchant network communication device 302 such as, for example, a Wifi wireless router connected to a network such as the Internet.

Referring now to FIG. 3b, in operation, each of the beacon devices 200 is configured to create a communication area 304 with its second communications system 204. For example, the second communications system 204 in each beacon device 200 may be a BLE communications device that provides an approximately 100 foot radius communications area. Depending on a desired coverage area, the power of individual beacon devices may be turned up or down to cover different sized areas, such that individual beacons within the location may have the same or different size coverage areas. However, other communications systems providing other communications areas are envisioned as falling within the scope of the present disclosure. As can be seen in the illustrated embodiment, the beacon devices 200 may be positioned in and around the merchant physical location 100 such that the communications areas 304 abut, overlap, or otherwise provide coverage for any area of interest within and around the merchant physical location 100. For example, as illustrated in FIG. 3b, the communications areas 304 may also provide coverage for one or more of the parking spaces 105a, 105b, 105c, and 105d. One of skill in the art in possession of the present disclosure will appreciate that different configurations of the beacon devices 200 within and around the merchant physical location 100 may be selected to cover any area within and around the merchant physical location 100 with a communications area 304.

As discussed in further detail below, each of the beacon devices 200 are configured to communicate with customer devices within their respective communications area 304 (e.g., using the second communication system 208) to collect information, and then send that information to the merchant network communication device 302 (e.g., using the first communication system 204) such that the data may be provided to a merchant device, a system provider device, and/or any other device operating to provide the service experience score system discussed below. In an embodiment, each of the beacon devices 200 may communicate with a database at the merchant physical location 100 to retrieve real-time service experience scores, discussed in further detail below.

Furthermore, one of skill in the art in possession of the present disclosure will recognize that the first communications system 204 and the second communications system 208 in the beacon devices 200 may be selected such that the service experience score system 300 does not require an Internet data connection or cellular data connection to collect and/or provide data for service experience scores. In other words, the service experience score system 300 may be provided as a local communication system within the merchant physical location 100 in which customer devices communicate through the beacon devices 200 with a system provider device that accesses local databases (i.e., stored at the merchant physical location 100) to retrieve and provide data for service experience scores utilizing customer devices, merchant devices, and/or service provider devices, among others. For example, in some embodiments, customer devices may be enabled to retrieve real-time service experience scores directly from a local database or system provider device at the merchant physical location 100 through the beacon devices 200, rather than through a website that may only be updated occasionally. However, in other embodiments, the system provider device in the service experience score system 300 may utilize an Internet data connection, cellular data connection, or other network to access remote databases for retrieving data for, and providing data related to, service experience scores (or other information discussed below) to the customer devices, merchant devices, and/or service provider devices.

In some of the figures associated with the embodiments discussed below, the beacon devices 200 and their communications areas 304 are not shown for the sake of clarity, but it should be understood that the communications and retrieval of information from beacon communication devices, and the provision of that information to a system provider device, may be accomplished using beacon devices providing communications areas such as the beacon devices 200 and communications areas 304 illustrated in FIGS. 3a and 3b. While a specific example of a service experience score system 300 is provided, one of skill in the art in possession of the present disclosure will recognize that a wide variety of different merchant physical locations may incorporate the beacon devices 200 in a variety of manners while remaining within its scope.

In the embodiments discussed below, the service experience score systems and methods involve a system provider using a system provider device to determine a start and end of a user service experience by communicating, through the beacon devices 200, with customer devices at the merchant physical location 100. As discussed in more detail below, the start and/or end of the user service experience may include any of several events which occur during a customer visit to the merchant physical location 100. For example, when the merchant physical location includes a restaurant, the start and/or end of the user service experience may include any of the customer parking a car, entering the restaurant, being seated, placing an order, receiving an order, paying for an order, leaving the restaurant, and leaving the parking area, and/or a variety of other service experience events known in the art, which can be detected by beacons as the customer enters or leaves a beacon coverage area. Thereby, the system provider device may generate a service experience score and/or subsets of that service experience score that is based at least partly on the start and end of the user service experience and/or subsets of that user service experience. Additionally, the system provider device may store any determined service experience scores in a database located at the merchant physical location 100 or a remote database, for example, by way of a network connection.

In some embodiments, the system provider device may be a merchant device that is local to the merchant physical location 100 and that communicates with the beacon devices 200 using the merchant network communication device 302. In other embodiments, the system provider may be, for example, a payment service provider that provides the service experience score system 300 for the merchant at the merchant physical location 100, and receives service experience scores at a payment service provider device that are sent from the customer devices, through the beacon devices 200, and possibly through a merchant device (including a local merchant database) and a network (e.g., the Internet). In such embodiments, the payment service provider device may associate the merchant physical location 100 (or its merchant), the beacon devices 200, merchant devices, and/or other components of the system with a merchant account in a database located in a non-transitory memory. As such, information sent and received through the beacon devices and merchant devices may be associated with the merchant account in the database, and any use of that information may be stored in association with that merchant account. As such, the payment service provider may provide a service experience score system for a plurality of different merchants and merchant physical locations. Moreover, in some embodiments, the service experience score system 300 in conjunction with the payment service provider device, may also associate specific customer transactions (e.g., orders/purchases) to specific areas (the bar area 108, the to-go area 110, the table seating area 112, the large booth seating area 114, the small booth seating area 116) of the merchant physical location 100 to provide area-specific and/or seat-specific service experience scores.

In an embodiment, the operation of the service experience score system 300 may include providing a mapping of the merchant physical location 100 in a database that describes each of the bar area 108, the to-go area 110, the table seating area 112, the large booth seating area 114, the small booth seating area 116, or other areas in accordance with various merchant physical locations. For example, service experience scores associated with each such area and/or other characteristics or features of these areas (e.g., particular booths, tables, barstools, etc.) may be determined by the system provider device and associated with the mapping of the merchant physical location 100, as discussed below. As discussed below, the use of such information to the system provider device allows the system provider device to create, provide, and utilize a detailed map, layout, or other reproduction of the merchant physical location interior 104 with the service experience details determined using the systems and methods discussed herein. Furthermore, the service experience scores for each of the various areas in the merchant physical location interior 104 may also be provided to the system provider device. In one example, the service experience scores for various areas in a restaurant may be provided to the merchant or system provider by selecting areas on a map of the physical merchant location 100. As discussed below, the mapped service experience scores may be used to assist merchants in improving customer service, to assist customers in selecting a preferred seating location in the physical merchant location 100, to assist customers in selecting between different merchant physical locations, and/or to provide a variety of other benefits that would be apparent to one of skill in the art in possession of the present disclosure. While a few examples of the provision of merchant physical location layout information and service experience scores have been described, one of skill in the art in possession of the present disclosure will recognize that a wide variety of merchant physical location information, service experience scores, and information provisioning techniques will allow for the functionality of the system provider device discussed below, and thus will fall within the scope of the present disclosure.

Furthermore, FIGS. 1, 3a, and 3b illustrate a merchant physical location 100 that is a single building, with the beacon devices 200 positioned to provide communications areas 304 that cover the interior of that single building, a parking area of the single building, and outside sections in the front of that single building. However, beacon devices 200 may be positioned virtually anywhere to retrieve information associated with a merchant physical location. For example, while beacon devices 200 have been illustrated to provide coverage to portions of a parking area 105, beacon devices 200 may be positioned throughout an entire parking lot, at the entrances or exits of that parking lot, and/or anywhere else relative to that parking lot in order to collect and send information from customer devices to the system provider device. In another example, the merchant physical location may be located in a mall, and beacon devices may be positioned around that mall, at the entrances or exits of that mall, and/or anywhere else relative to that mall in order to collect and send information from customer devices to the system provider device. In some examples, the first communication system may be connected to Wifi networks available outside the merchant physical location in order to communicate collected information to a system provider device. In other examples, the first communication system may be a cellular communications system that allows the beacon devices to be positioned anywhere in range of a cellular communications tower, allowing beacon devices to be positioned in virtually any physical location when providing the product information system. As such, experience scores associated with the merchant physical location 100 may incorporate customer actions that are performed outside the merchant physical location 100.

Figure 4:
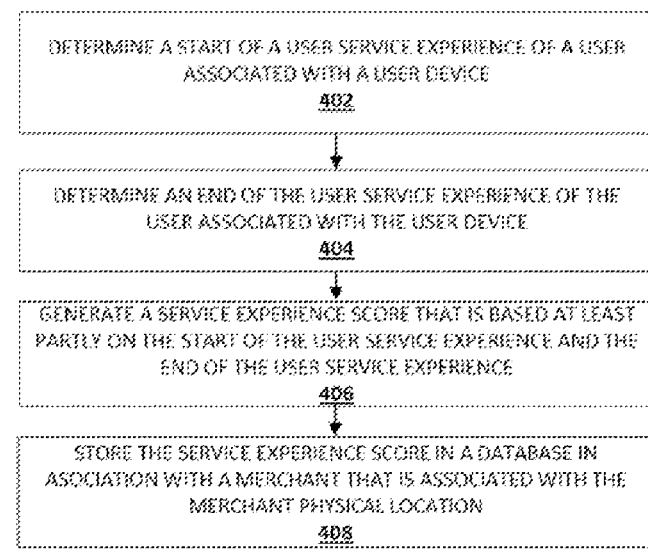
FIG. 4 is a flow chart illustrating an embodiment of a method for providing a service experience score.

Referring now to FIG. 4, an embodiment of a method 400 for providing service experience scores for merchant physical locations is illustrated. One of skill in the art in possession of the present disclosure will recognize that the method 400 may be performed at the merchant physical location 100 for a plurality of different users to determine user service experience scores and then aggregate those user service experience scores to generate an aggregated merchant experience score that is indicative of the average service experience for a customer at that merchant physical location. Those aggregated service experience scores may then be provided by the system provider device over a network for display on a user device of a user that is attempting to determine whether to visit the merchant physical location 100. Likewise, merchant service experience scores associated with particular areas within the merchant physical location 100 may be determined in a similar manner.

The method 400 begins at block 402 where a start of a user service experience of a user associated with a user device is determined. In some embodiments, a user service experience may include a total amount of time a user spends visiting a merchant physical location 100 (e.g., a restaurant). In other embodiments, a user service experience may include an amount of time a user spends waiting to be seated at the merchant physical location 100. In yet other embodiments, a user service experience may include an amount of time a user spends waiting for an order at the merchant physical location 100. In other embodiments, a user service experience may include an amount of time a user spends waiting to pay for an order at the merchant physical location 100. While a few examples of components that make up a user service experience have been provided, any other user service experience, including any combination of subsets of events of the user service experience, may be utilized in the service experience score taught herein and is envisioned as falling within the scope of the present disclosure.

As discussed above, a user service experience may include one of many events or subset of events, and the start of such a user service experience may likewise include one of a variety of different individual events such as parking a vehicle, entering the merchant physical location 100, or leaving the merchant physical location 100, as well as individual service events occurring while at the merchant physical location 100 such as being seated, placing an order, receiving an order, paying for an order, and/or a variety of other service experience events known in the art. At block 402, when such an event happens, as may be determined by communication or break in communication between at least one beacon device 200 and a user device of a customer or a merchant device of the merchant, a timestamp may be recorded by the system provider that indicates a start time of the user service experience. Moreover, as discussed below, the system provider device may generate a service experience score that is based at least partly on the start of the user service experience. While some examples of a start of a user service experience have been provided, a variety of user service experience start events are envisioned as falling within the scope of the present disclosure.

Figure 5:
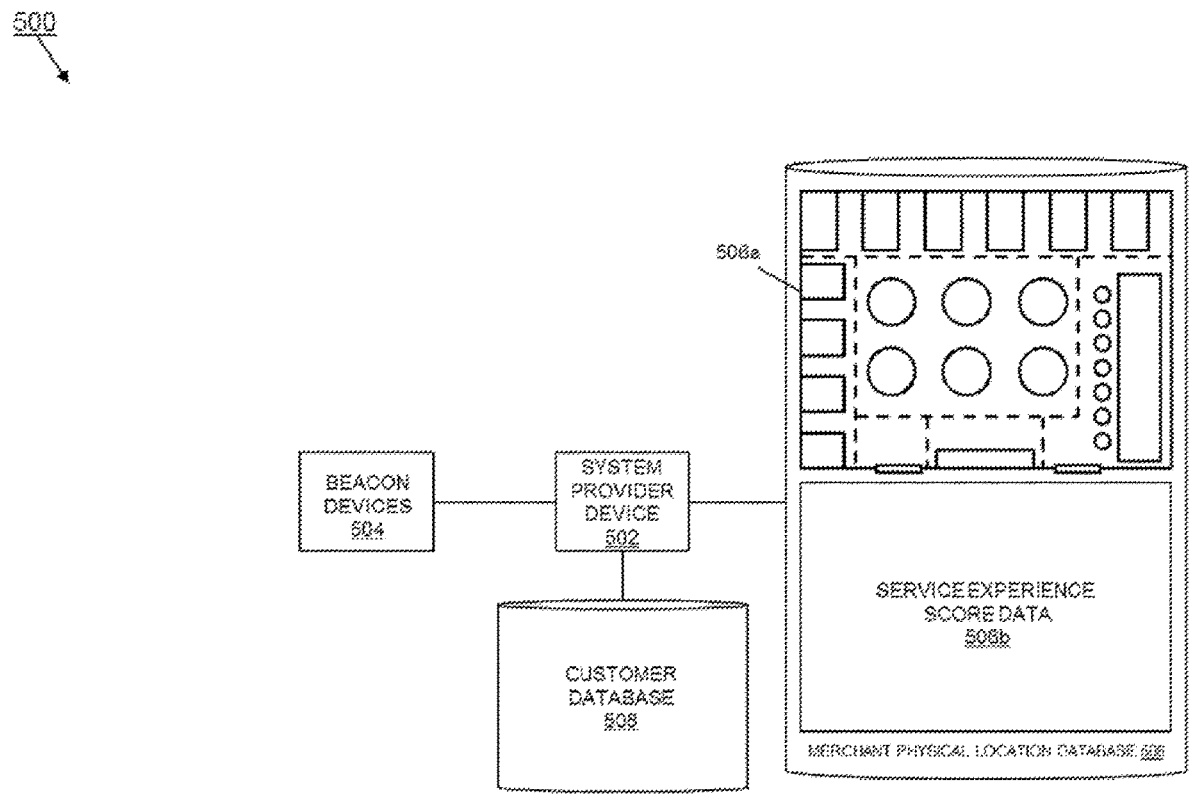
FIG. 5 is a schematic view illustrating an embodiment of a system provider device connected to beacon devices in the merchant physical location of FIG. 3a and to customer and merchant physical location databases to provide a service experience score.

Referring to FIG. 5, an embodiment of a portion of a service experience score system 500 is illustrated that may be used to determine the start of a user service experience at block 402. The service experience score system 500 includes a system provider device 502 communicatively coupled to beacon devices 504 (which may be the beacon devices 200 discussed above), a merchant physical location database 506, and a customer database 508. While illustrated as single databases, the merchant physical location database 506 and customer database 508 may include multiple databases that may be located at the merchant physical location 100 and/or coupled to system provider device 502 by a network (e.g., the Internet).

In an embodiment, the merchant physical location database 506 may store the merchant physical location information 506a discussed above that describes the layout of the merchant physical location 100 including the bar area 108, the to-go area 110, the table seating area 112, the large booth seating area 114, the small booth seating area 116, and which may include service experience scores that have been collected from a plurality of different customers and that may be associated with each area of the merchant physical location 100 and/or any other features in the merchant physical location interior 104. As such, the merchant physical location database 506 may also include service experience score data 506b about each of the areas in the merchant physical location 100, and any of the service experience scores or associated data may be updated in real-time as it is generated by customers in the merchant physical location 100. Furthermore, the customer database 508 may store customer information such as customer account information, customer purchase histories, customer seating locations associated with customer purchases, customer preferences, and/or a variety of other customer information known in the art.

Figure 6A:
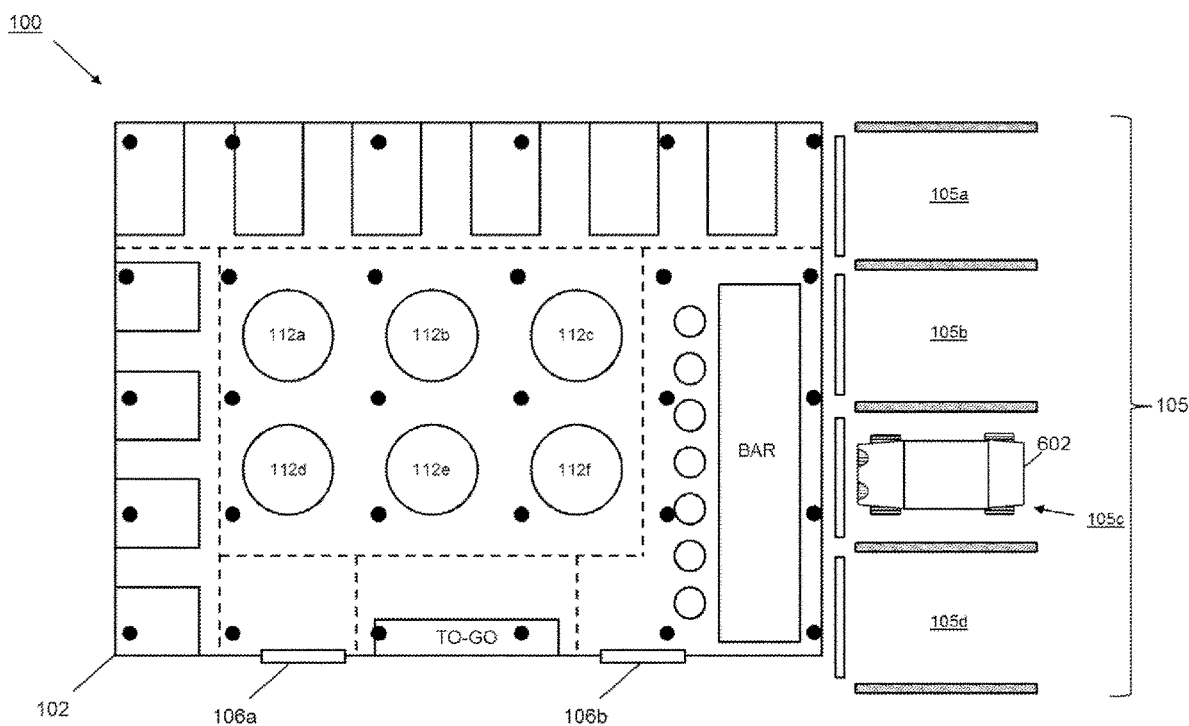
FIG. 6a is a schematic view illustrating an embodiment of a customer parking at the merchant physical location of FIG. 1.
Figure 6B:
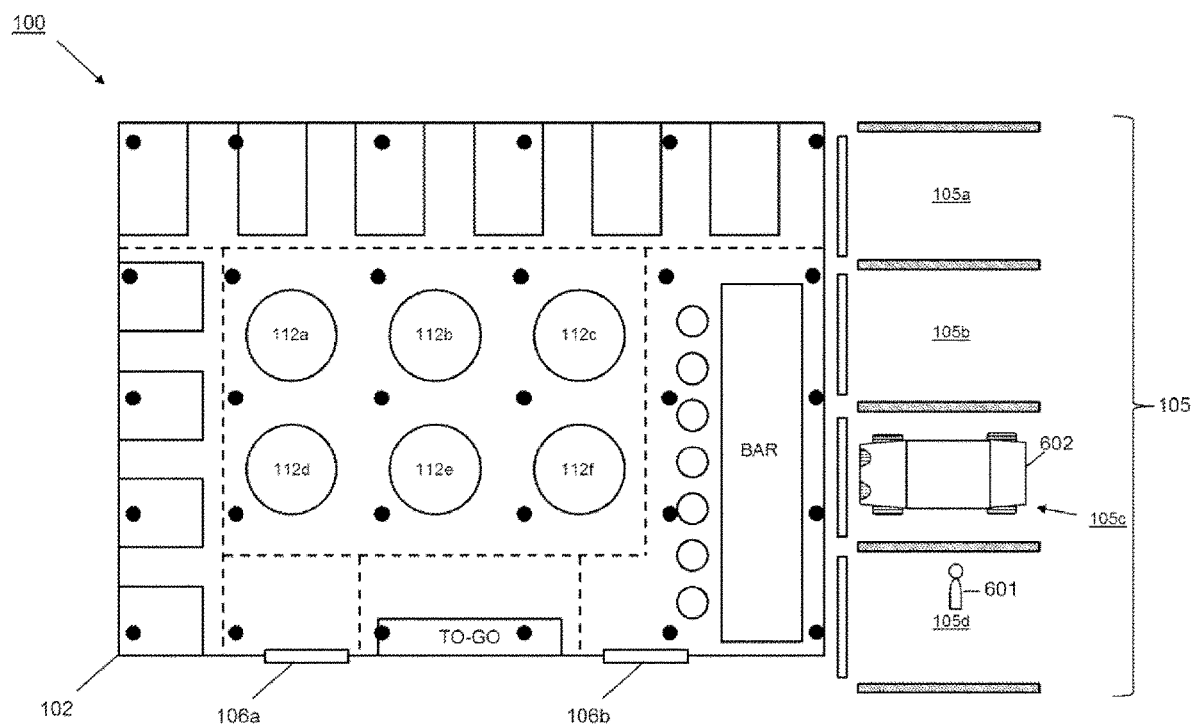
FIG. 6b is a schematic view illustrating an embodiment of a customer walking toward the merchant physical location of FIG. 1.
Figure 6C:
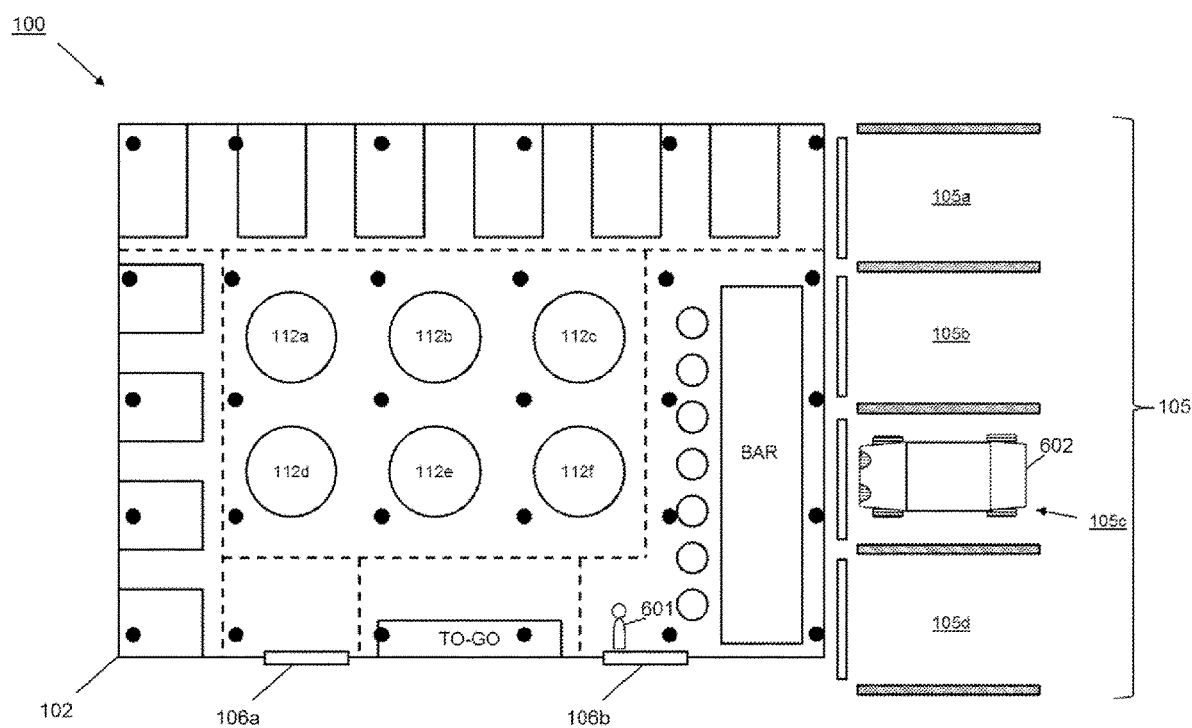
FIG. 6c is a schematic view illustrating an embodiment of a customer entering the merchant physical location of FIG. 1.
Figure 6D:
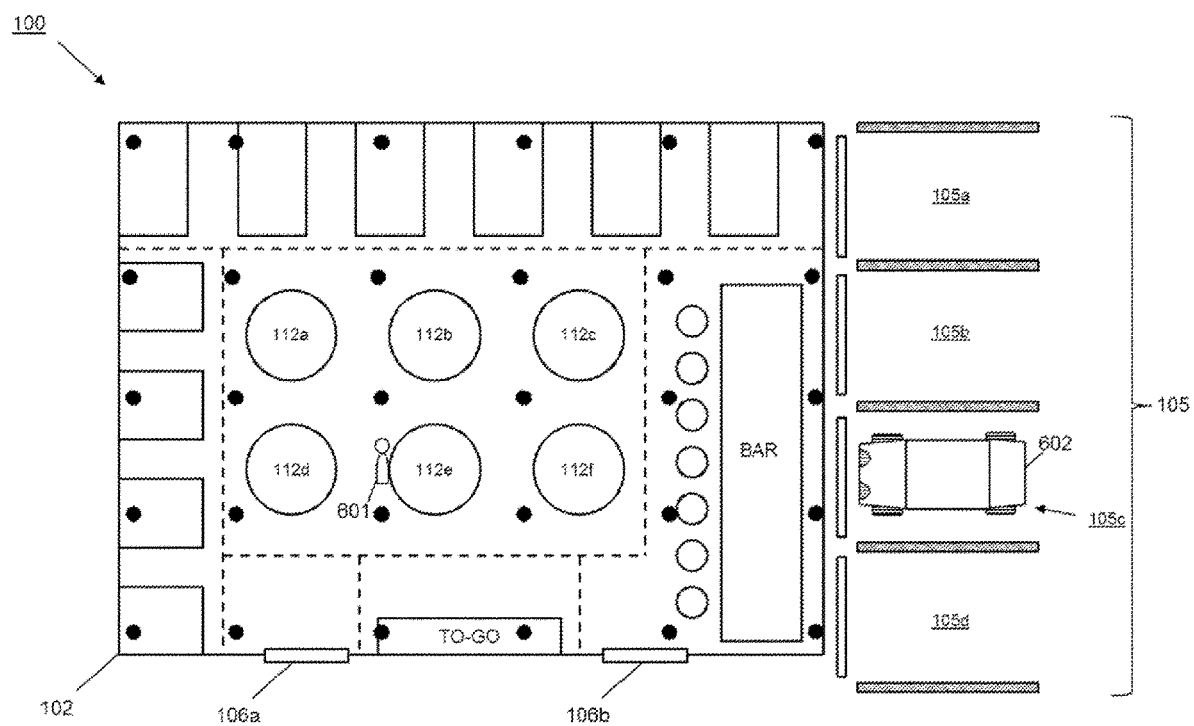
FIG. 6d is a schematic view illustrating an embodiment of a customer being seated at the merchant physical location of FIG. 1.
Figure 6E:
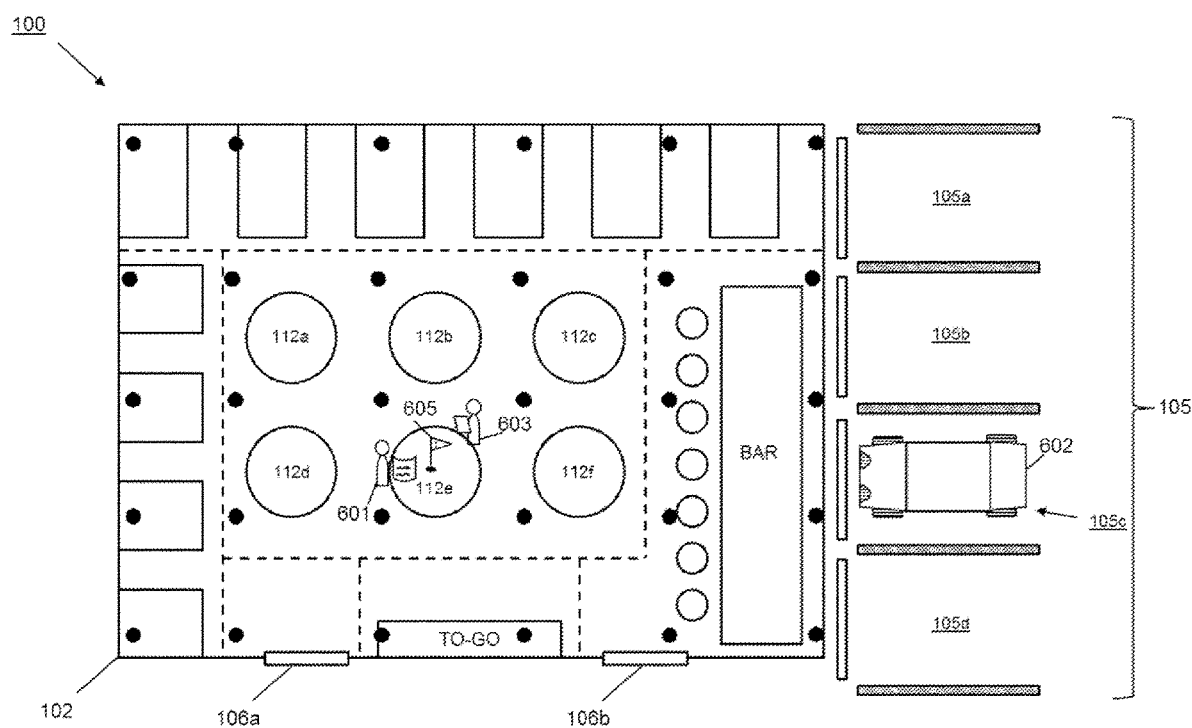
FIG. 6e is a schematic view illustrating an embodiment of a customer placing an order at the merchant physical location of FIG. 1.
Figure 6F:
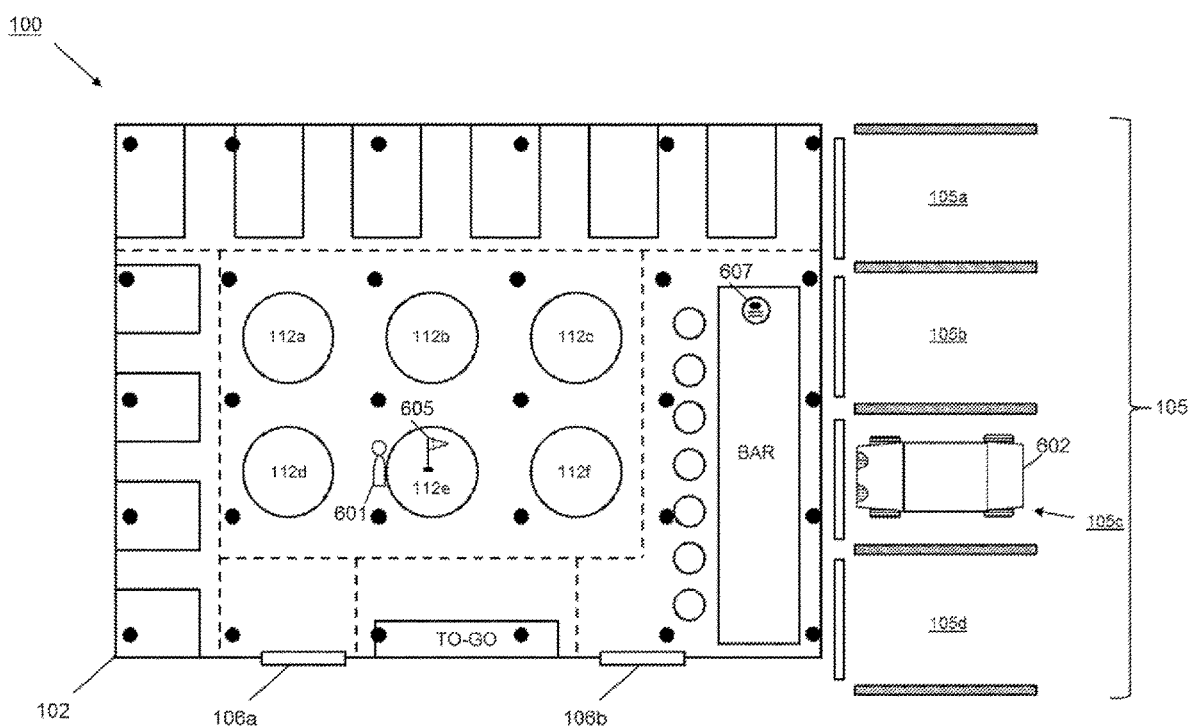
FIG. 6f is a schematic view illustrating an embodiment of a customer waiting for the order at the merchant physical location of FIG. 1.
Figure 6G:
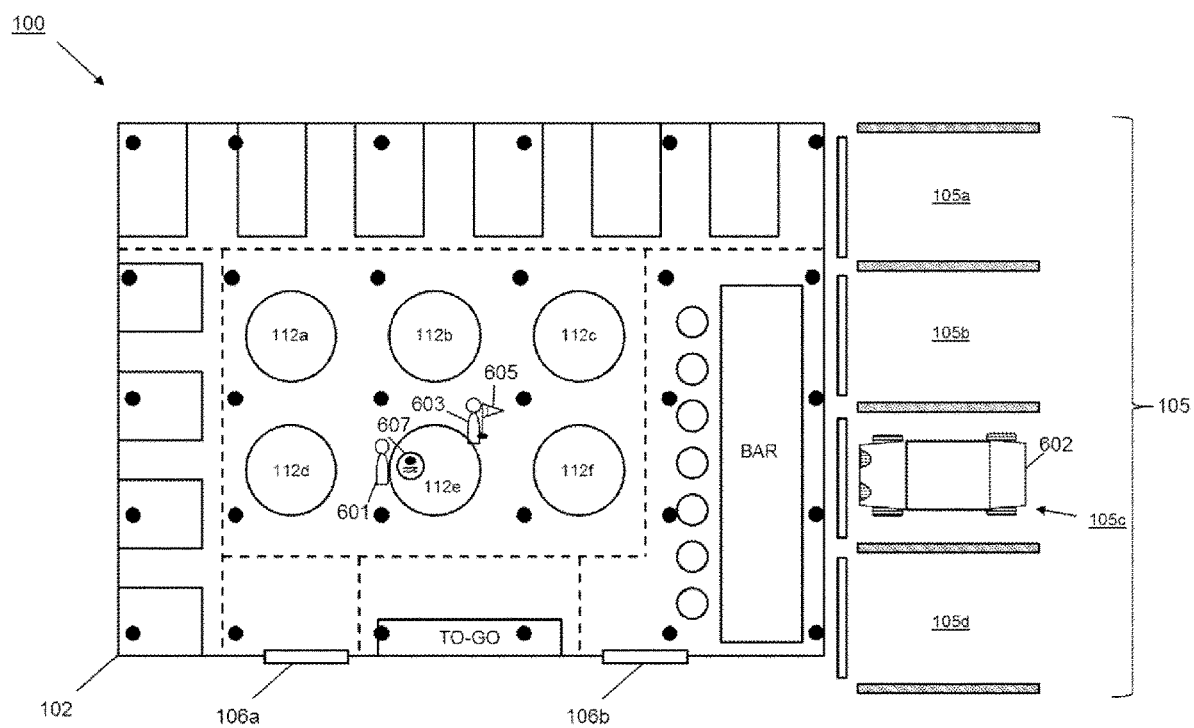
FIG. 6g is a schematic view illustrating an embodiment of a customer receiving the order at the merchant physical location of FIG. 1.
Figure 6H:
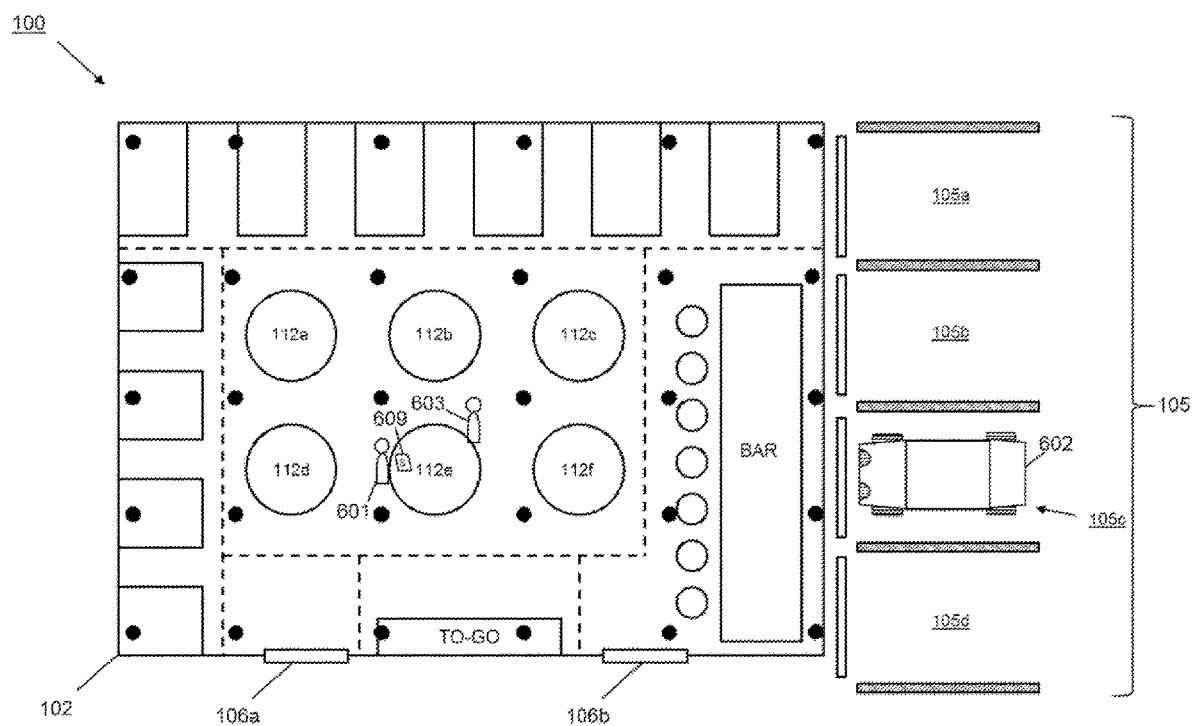
FIG. 6h is a schematic view illustrating an embodiment of a customer paying for the order at the merchant physical location of FIG. 1.
Figure 6I:
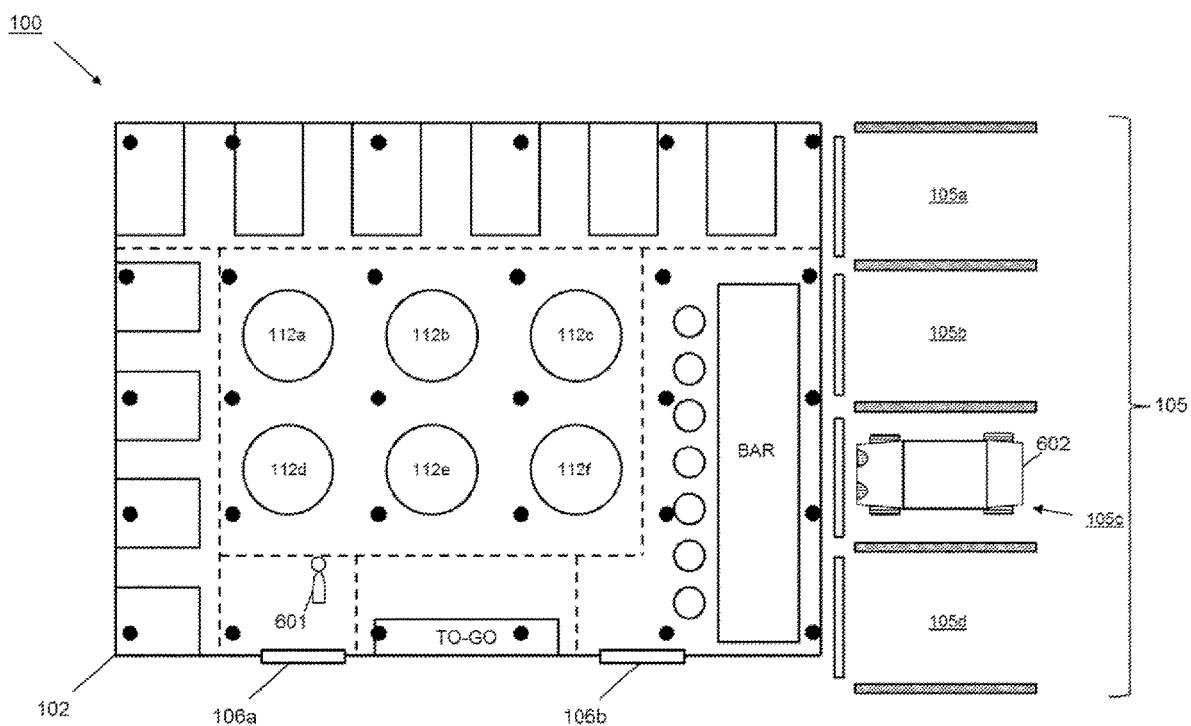
FIG. 6i is a schematic view illustrating an embodiment of a customer walking toward an exit at the merchant physical location of FIG. 1.
Figure 6J:
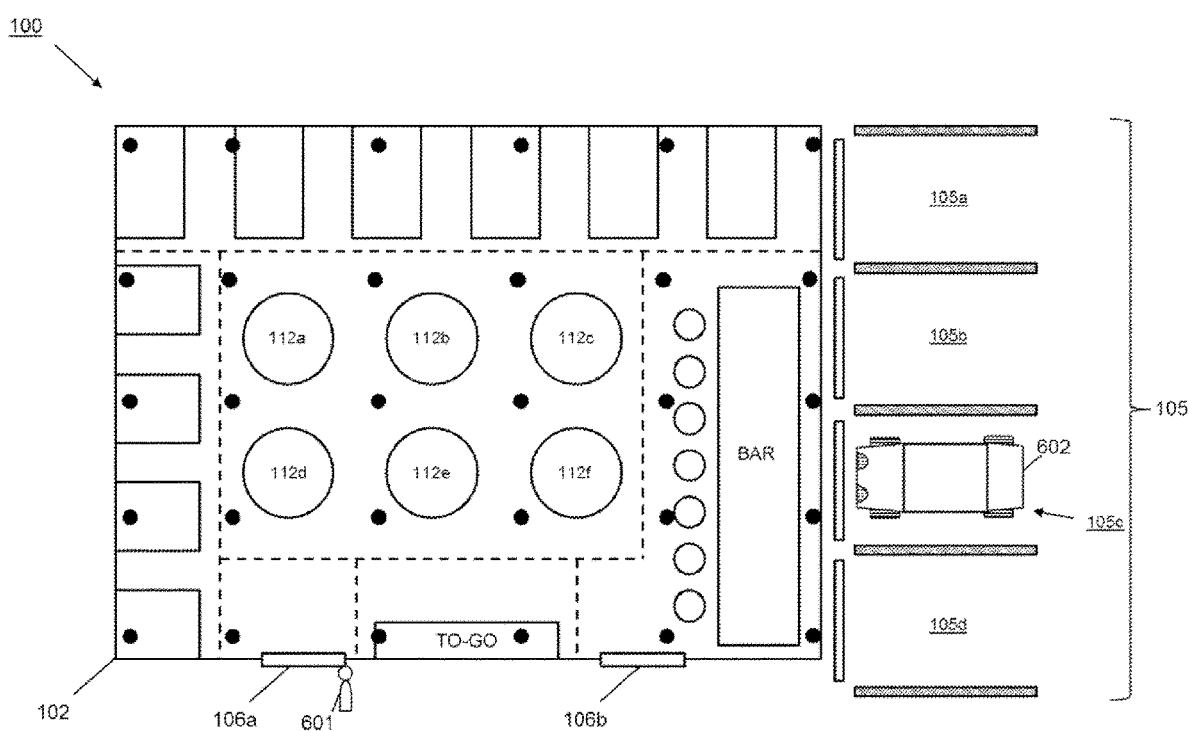
FIG. 6j is a schematic view illustrating an embodiment of a customer exiting the merchant physical location of FIG. 1.
Figure 6K:
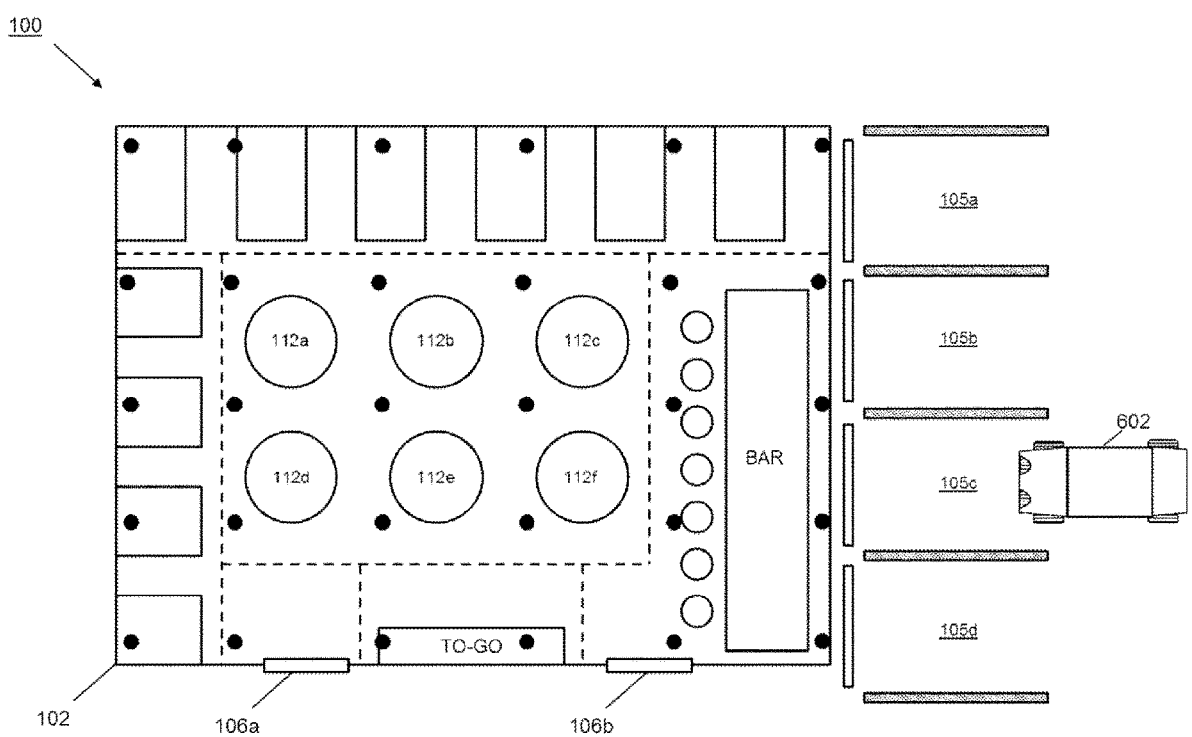
FIG. 6k is a schematic view illustrating an embodiment of a customer leaving a parking area at the merchant physical location of FIG. 1.
Figure 6I:
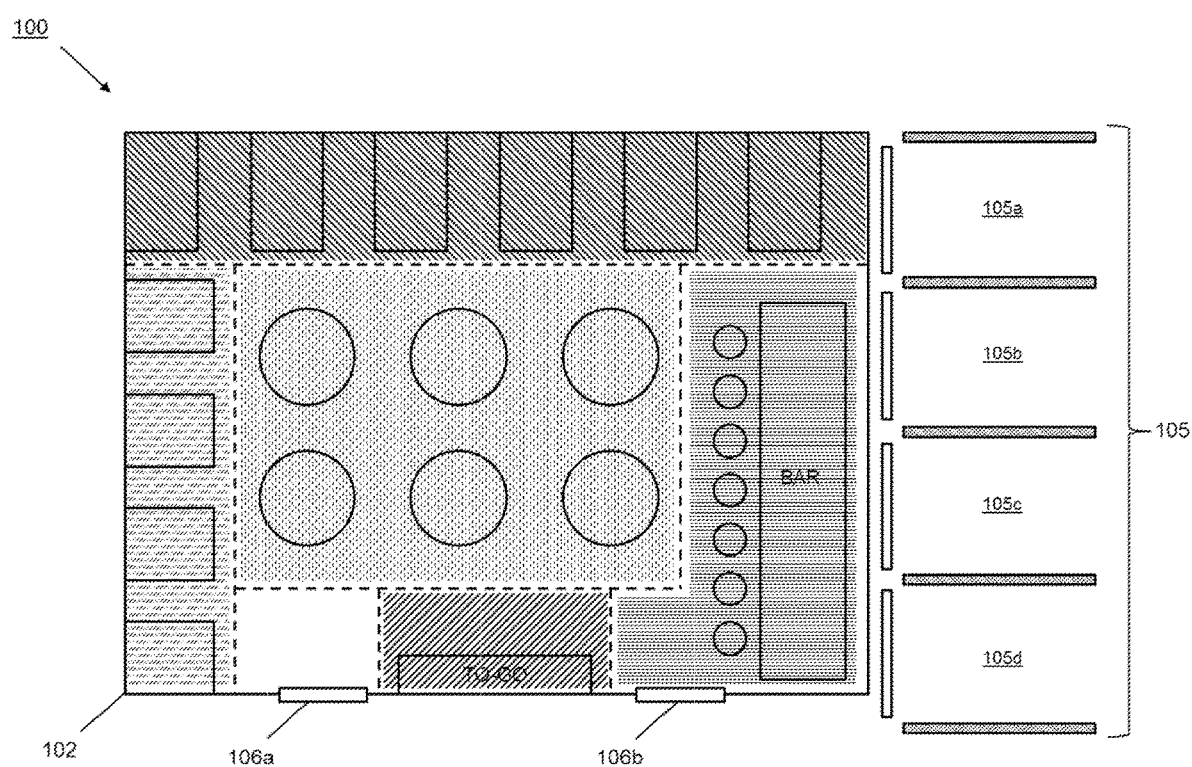
Figure 6M:
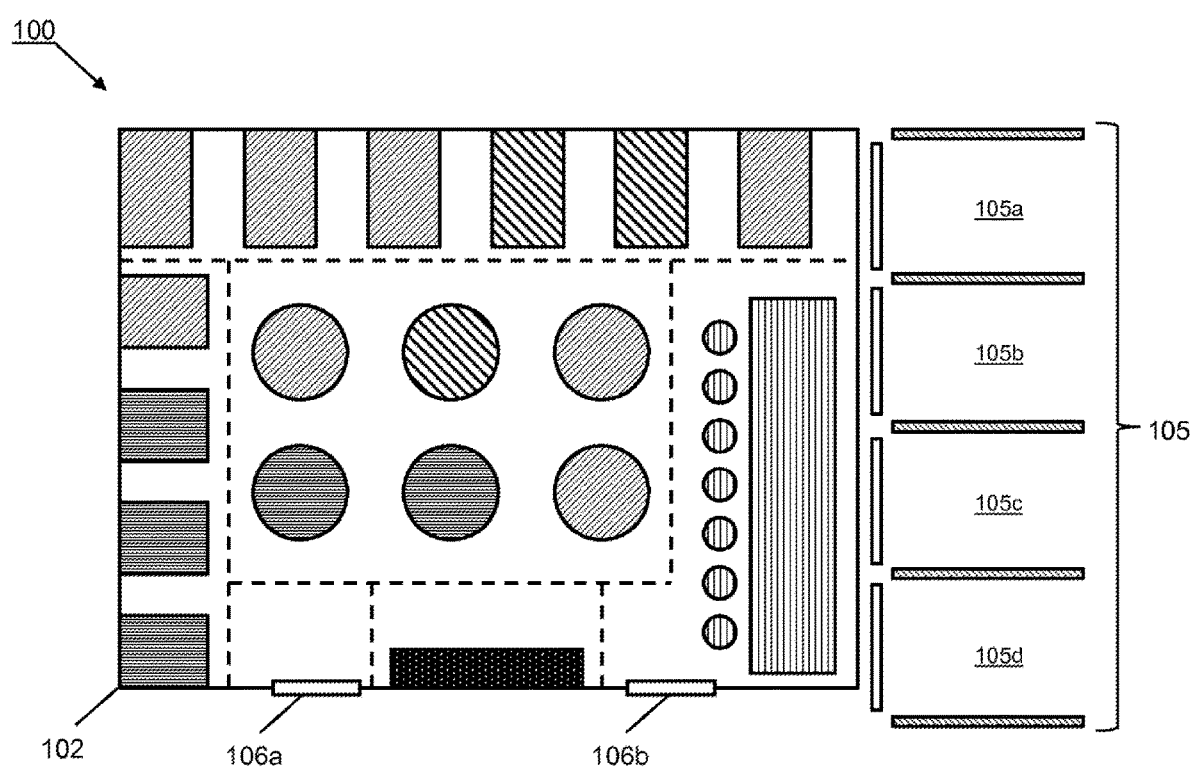
FIG. 6m is a schematic view illustrating an embodiment of a map of the merchant physical location of FIG. 1 illustrating a second method for displaying service experience scores.
Figure 7:
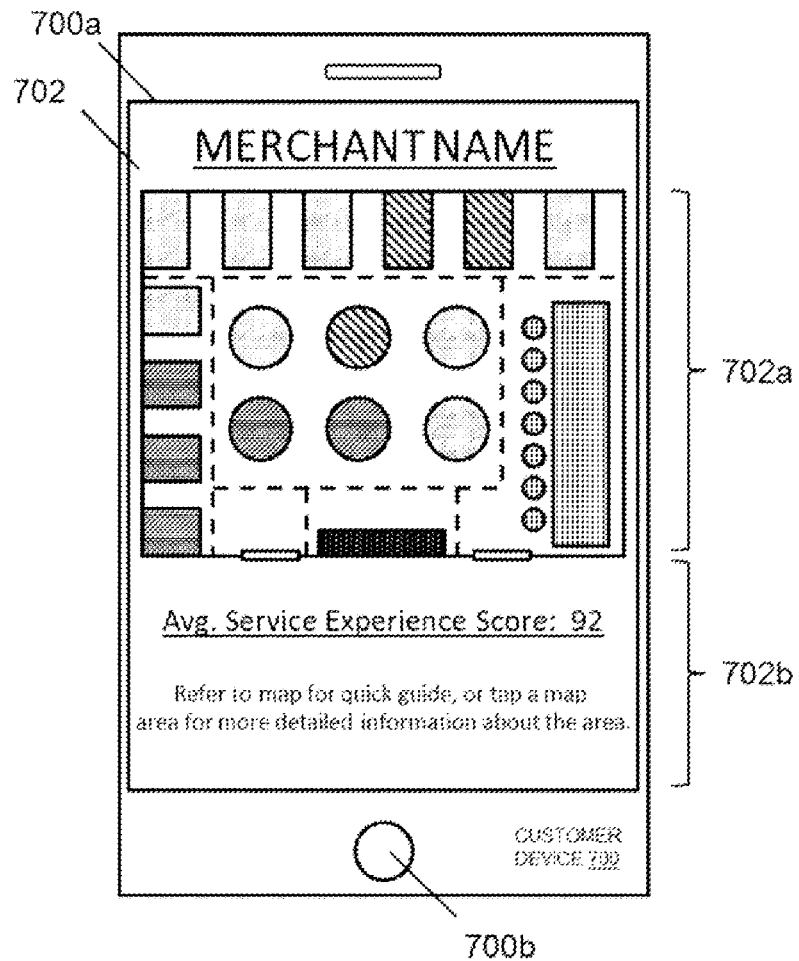
FIG. 7 is a front view illustrating an embodiment of a customer device displaying a service experience score screen.

Referring now to FIGS. 4, 6, and 7, a specific example of block 402 of the method 400 is herein described. Referring first to FIG. 6a, a vehicle 602 is illustrated having arrived at the merchant physical location 100 and parked in the parking space 105c. In some embodiments, a beacon device 200 having coverage of the parking space 105c of the parking area 105 may communicate with a user device of a customer 601 (not shown) in the vehicle 602 arriving and/or parking in the parking space 105c, and data from that communication may be used by the system provider device to determine a starting time for the customer's visit, which may also be determined to be the start of a user service experience (block 402 of FIG. 4). In FIG. 6b, the customer 601 is illustrated as having exited the vehicle 602 and walking toward the merchant physical location 100. The customer 601 may then enter the merchant physical location, as shown in FIG. 6c, for example through the door 106b. In an embodiment, a beacon device 200 having a coverage area that includes the restaurant door 106b may communicate with the user device of the customer 601 entering the merchant physical location (e.g., a restaurant). In some embodiments, a time at which the customer 601 enters the merchant physical location 100 may be determined to be the start of the user service experience (block 402 of FIG. 4). For example, when there are no beacons 200 with a coverage area including the parking area 105 or when the customer 601 arrived at the merchant physical location 100 by an alternative mode of transportation (e.g., walking, by bus, etc.), then the first interaction any of the beacons 200 has with the user device may be when the customer 601 enters the merchant physical location 100, or when the customer's user device is within range of one or more of the beacons 200. As discussed in further detail below, in some embodiments the time between the parking of the vehicle and the entry of the customer 601 to the merchant physical location 100 may be a subset of a service experience that is used to determine one or more of the service experience scores for the merchant physical location 100.

In the embodiment illustrated in FIG. 6c, the customer 601 is illustrated having entered the merchant physical location 100 and looking for a place to sit or waiting to be seated by a host/hostess. In various embodiments, the customer 601 or merchant may select a place for the customer to sit based on a user service experience score of a particular area of the restaurant, as discussed below. Specifically, referring now to FIG. 7, a customer or merchant device 700 is illustrated that includes a display 700a and an input button 700b displaying an area-specific merchant physical location service experience map. While the customer device 700 is illustrated and described as a mobile phone, a variety of other customer devices are envisioned as falling within the scope of the present disclosure. Moreover, a restaurant host/hostess or other employee of the merchant of the merchant physical location 100 may utilize a similar device to aid in the seating of guests such as the customer 601. In the illustrated embodiment, the customer device 700 is displaying a service experience score screen 702 that provides the customer 601 and/or merchant with information regarding the service experience score for different areas of the physical merchant location 100. In one example, the customer device 700 may include a service experience application, which may be launched by the customer 601 or may automatically launch upon entering the merchant physical location 100 (e.g., in response to communication with the beacon devices 504), that provides for the functionality of the customer device 700 discussed below. In the illustrated embodiment, the service experience score screen 702 includes a map section 702a (illustrating the map of FIG. 6m, discussed below) and an information section 702b for providing service experience scores for areas of the merchant physical location 100 to the customer 601 or merchant.

In some embodiments, the service experience score available to the customer 601 or merchant through the service experience application may be based on historical data compiled from prior visits of other customers, and in some cases may also include data associated with prior visits of the customer 601. While the service experience application is illustrated as providing the service experience score screen 702 immediately, in some embodiments, the customer 601 or merchant may be required to provide authentication credentials in order to access the service experience score screen 702.

Continuing with the above example and referring now to FIGS. 4 and 6d, the customer 601 is illustrated entering the table seating area 112 and being seated at a table 112e. A beacon device 200 having a coverage area that includes the table 112e may communicate with the user device of the customer 601 seated at the table 112e. In some embodiments, a time at which the customer 601 enters the table seating area 112 may be determined by the system provider device to be the start of the user service experience (block 402 of FIG. 4). In other embodiments, a time at which the customer 601 is seated at the table 112e may be determined by the system provider device to be the start of the user service experience. Alternatively, in some embodiments, when the customer enters the table seating area 112 or is seated at the table 112e, the method 400 proceeds to block 404 (FIG. 4) where an end of a user service experience of a user associated with a user device may be determined by the system provider device. Thus, in this example, the user experience may include the amount of time the customer 601 spent waiting to be seated at the merchant physical location 100, as measured from when the customer 601 arrived in the vehicle 602 (FIG. 6a) or when the customer 601 entered the merchant physical location 100 (FIG. 6c), to when the customer 601 entered the table seating area 112 or when the customer is seated at the table 112e. In some embodiments of the block 404, when the end of the user service experience is determined, the system provider device may record a timestamp indicating an end time of the user service experience. As described above, in some embodiments, seating of the customer 601 may be regarded as the end of a subset of the user service experience. In addition, the seating of the customer may be the beginning of another subset of the user service experience (e.g., a customer visit to the merchant may include a first subset of the user service experience of waiting to be seated, and a second subset of the user service experience of waiting to be served after being seated, etc.). However, the seating of the customer 601 may also be regarded as a single service event occurring during the course of a broader user service experience (e.g., a visit to a restaurant).

The method 400 then proceeds to block 406 where the system provider device generates a service experience score that is based at least partly on the start of the user service experience and the end of the user service experience. In an embodiment of block 406, the system provider device may measure a time between the start of the user service experience and the end of the user service experience, measured as described above, and the service experience score may then be generated at least partly using the measured time between the start and end of the user service experience. Thereafter, the method 400 proceeds to block 408 where the service experience score is stored in a database in association with a merchant that is associated with the merchant physical location 100. In various embodiments of the block 408, the service experience score may be stored in a local or remote database and may include the merchant physical location database 506 and/or the customer database 508, as described with reference to FIG. 5.

Referring now to FIG. 6e, the customer 601 is illustrated placing an order with a waiter 603. In some embodiments, the waiter 603 may have a wearable beacon device 200 that communicates with the user device of the customer 601 seated at the table 112e. In other embodiments, an order number stand 605 may have an attached or embedded beacon device 200 that communicates with the user device of the customer 601 seated at the table 112e. In various embodiments, placing an order may be regarded as an individual service event, or as the start/end of a user service experience. In either example, when the customer 601 places an order with the waiter 603, as determined by communication between the user device and a beacon device 200 (e.g., a waiter 603 wearable beacon device or a table number stand 605 beacon device), the system provider device may record a timestamp indicating a service event time or the start/end of a user service experience (block 402 or 404 of FIG. 4).

In some embodiments, the ordering of a particular item may be associated with a service experience score. For example, services experience times and/or other service experience details may differ based on what the service is for (e.g., the ordering of a cooked to order steak may take longer than the ordering of a pre-cooked item). The system provider device may associate order details with a user service experience such that service experience scores may be ordered-item specific, which allows a customer to determine a service experience score for the merchant physical location based on the item that the customer is thinking about ordering. Such embodiments allow for a customer to make a decision on what to order at a merchant physical location based on how long it will take for that order to be provided.

The system provider device may then generate a service experience score (block 406 of FIG. 4) based at least partly on the start/end of the user service experience illustrated in FIG. 6e. For example, in an embodiment of block 406, the system provider device may measure a time between when the customer 601 was seated (in some embodiments, the start of the user service experience) and when the customer 601 placed their order with the waiter 603 (in some embodiments, the end of the user service experience). The service experience score may then be generated at least partly using the measured time between the start and end of the user service experience. The service experience score may then be stored in a database (block 408 of FIG. 4) associated with the merchant physical location 100, as described above.

In some embodiments, in addition to storing the service experience score (or subset thereof) in association with the merchant physical location 100 or areas within the merchant physical location 100, the service experience scores may be associated with employees (e.g., the waiter 603 in the example above) of the merchant. As such, the database of the system provider may include service experience scores associated with employees that provided service to a customer (e.g., a service experience score associated with a valet that is based on the time the customer's vehicle arrived at the physical merchant location and the time the vehicle was taken from the customer, as well as the time it took to return the vehicle to the customer; a service experience score associated with a host/hostess that is based on the time the customer entered the merchant physical location and the time the customer was seated at a table; a service experience score associated with a waiter that is based on the time a customer was seated at a table, a time the customer ordered, a time the customer's drinks were refilled, a time the customer's order was served, a time the bill was provided, a time the bill was returned, etc.; a service experience score for a cook based on the time the order was taken from the customer and a time the order to ready for delivery by the waiter, etc.) While a few examples have been provided, one of skill in the art in possession of the present disclosure will recognized that service experience scores may be associated with any employees of any merchant in a similar manner while remaining within the scope of the present disclosure.

Referring now to FIG. 6f, the customer 601 is illustrated waiting for an order 607 at the merchant physical location 100. In the example shown, the order 607 is ready and waiting for delivery by the waiter 603 (as discussed above, the entry of the order by the waiter 603 into a merchant device may be the start of a service experience event, and the completion of the order by kitchen staff may be the end of a service experience event, and those may result in a service experience score). In some embodiments, a kitchen staff member may communicate with the system provider device 502 (FIG. 5) to indicate that the order 607 is ready. In one example, the order 607 may be served on a plate having an attached or embedded beacon device 200 that communicates with the system provider device 502. In various embodiments, completion of the order 607 may be regarded as an individual service event, or as the start/end of a user service experience. In either example, when the order 607 is ready, the system provider device may record a timestamp indicating a service event time or the start/end of a user service experience (block 402 or 404 of FIG. 4).

The system provider device may then generate a service experience score (block 406 of FIG. 4) based at least partly on the start/end of the user service experience illustrated in FIG. 6f. For example, in an embodiment of block 406, the system provider device may measure a time between when the customer 601 placed the order 607 with the waiter 603 (in some embodiments, the start of the user service experience) and when the order 607 was ready (in some embodiments, the end of the user service experience). The service experience score may then be generated at least partly using the measured time between the start and end of such a user service experience. The service experience score may then be stored in a database (block 408 of FIG. 4) associated with the merchant physical location 100, as described above.

Referring now to FIG. 6g, the customer 601 is illustrated receiving the order 607 delivered by the waiter 603. In some embodiments, delivery of the order 607 may be communicated to the system provider device 502 by a beacon device 200 that is attached or embedded within the served plate. In other embodiments, delivery of the order 607 may be communicated to the system provider device 502 by removal of the order number stand 605, which has an attached or embedded beacon device 200, from the table 112e. In yet other embodiments, delivery of the order 607 may be communicated to the system provider device 502 by the waiter 603 walking away from the table 112e, as determined by a waiter 603 wearable beacon communication device, after delivery of the order 607. In various embodiments, completion of delivery of the order 607 may be regarded as an individual service event, or as the start/end of a user service experience. In either example, when the order 607 is delivered, the system provider device may record a timestamp indicating a service event time or the start/end of a user service experience (block 402 or 404 of FIG. 4).

The system provider device may then generate a service experience score (block 406 of FIG. 4) based at least partly on the start/end of the user service experience illustrated in FIG. 6g. For example, in an embodiment of block 406, the system provider device may measure a time between when the order 607 was taken or ready (in some embodiments, the start of the user service experience) and when the order 607 was delivered to the customer 601 (in some embodiments, the end of the user service experience). The service experience score may then be generated at least partly using the measured time between the start and end of such a user service experience. The service experience score may then be stored in a database (block 408 of FIG. 4) associated with the merchant physical location 100, as described above.

Referring now to FIG. 6h, the customer 601 is illustrated paying for the order, as shown by the check/payment 609. In some embodiments, payment of the order is accomplished electronically, for example by a payment service provider, as discussed above. In other embodiments, payment of the order may be made by cash, check, or credit/debit card. In either example, payment of the order may then be communicated to the system provider device 502, for example manually by way of the host/hostess 603 interfacing with a register in communication with the system provider device and/or electronically by way of the payment service provider. In various embodiments, payment of the order may be regarded as an individual service event, or as the start/end of a user service experience. In either example, when the order is paid for, the system provider device may record a timestamp indicating a service event time or the start/end of a user service experience (block 402 or 404 of FIG. 4).

The system provider device may then generate a service experience score (block 406 of FIG. 4) based at least partly on the start/end of the user service experience illustrated in FIG. 6h. For example, in an embodiment of block 406, the system provider device may measure a time between when the payment (e.g., credit/debit card) was delivered to the host/hostess 603 (in some embodiments, the start of the user service experience) and when the host/hostess 603 returned to the table 112e with a charge receipt requiring the customer's signature (in some embodiments, the end of the user service experience). The service experience score may then be generated at least partly using the measured time between the start and end of such a user service experience. The service experience score may then be stored in a database (block 408 of FIG. 4) associated with the merchant physical location 100, as described above.

After paying for their order, the customer 601 may choose to stay at the table 112e. For example, if the customer 601 is dining with other customers, the customer 601 may choose to stay at the merchant physical location to relax and talk with the other customers without requiring or requesting additional service from the host/hostess 603. Thus, in some embodiments, the time that the customer 601 spends within the merchant physical location 100 after paying for their order may be disregarded or otherwise not considered in determining the service experience score. Rather, in some embodiments and as illustrated in FIG. 6i, the next event where a timestamp may be recorded by the service provider device, and which may be used to determine the service experience score, is when the customer 601 walks away from the table 112e and/or exits the merchant physical location 100. This may be determined by a beacon device 200 having a coverage area that includes the table 112e and that is in communication with the user device of the customer 601. In various embodiments, the customer leaving the table 112e may be regarded as the end of a user service experience (block 404 of FIG. 4), and the system provider device may then generate a service experience score (block 406 of FIG. 4) based at least partly on the end of the user service experience illustrated in FIG. 6i. For example, in an embodiment of block 406, the system provider device may measure a time between when the customer 601 entered the merchant physical location 100 or was seated at the table 112*e* (in some embodiments, the start of the user service experience) and when the customer left the table 112*e* (in some embodiments, the end of the user service experience), without consideration of any time spent at the table 112*e* after paying for the order (e.g., to visit with other customers). The service experience score may then be generated at least partly using the measured time between the start and end of such a user service experience. The service experience score may then be stored in a database (block 408 of FIG. 4) associated with the merchant physical location 100, as described above.

Alternatively, in some embodiments, the customer leaving the table seating area 112 may be regarded as the end of a user service experience (block 404 of FIG. 4), and the system provider device may then generate a service experience score (block 406 of FIG. 4) based at least partly on the end of the user service experience illustrated in FIG. 6*i*. For example, in an embodiment of block 406, the system provider device may measure a time between when the customer 601 entered the table seating area 112 (FIG. 6*d*, in some embodiments, the start of the user service experience) and when the customer left the table seating area 112 (FIG. 6*i*, in some embodiments, the end of the user service experience). The service experience score may then be generated at least partly using the measured time between the start and end of such a user service experience, and stored in a database (block 408 of FIG. 4) associated with the merchant physical location 100.

Referring now to FIG. 6*j*, the customer 601 is illustrated leaving the merchant physical location through the door 106*a*. A beacon device 200 having a coverage area that includes the restaurant door 106*a* may communicate with the user device of the customer 601 leaving the merchant physical location (e.g., the restaurant). In some embodiments, a time at which the customer 601 leaves the merchant physical location 100 is determined to be the end of the user service experience (block 404 of FIG. 4), and the system provider device may then generate a service experience score (block 406 of FIG. 4) based at least partly on the end of the user service experience illustrated in FIG. 6*j*. For example, in an embodiment of block 406, the system provider device may measure a time between when the customer 601 entered the merchant physical location 100 (FIG. 6*c*, in some embodiments, the start of the user service experience) and when the customer left the merchant physical location (FIG. 6*j*, in some embodiments, the end of the user service experience). The service experience score may then be generated at least partly using the measured time between the start and end of such a user service experience, and stored in a database (block 408 of FIG. 4) associated with the merchant physical location 100.

Referring now to FIG. 6*k*, the customer (not shown) entered the vehicle 602 and is illustrated departing from the parking space 105*c* of the parking area 105 of the merchant physical location 100. In some embodiments, a beacon device 200 having coverage of the parking space 105*c* may communicate with a user device of a customer 601 (not shown) in the vehicle 602 and thus determine an ending time for the customer's visit, which may also be determined to be the end of a user service experience (block 402 of FIG. 4). The system provider device may then generate a service experience score (block 406 of FIG. 4) based at least partly on the end of the user service experience illustrated in FIG. 6*k*. For example, in an embodiment of block 406, the system provider device may measure a time between when the customer 601 arrived and parked in the parking space 105*c* (FIG. 6*a*, in some embodiments, the start of the user service experience) and when the customer departed from the parking space 105*c* (FIG. 6*k*, in some embodiments, the end of the user service experience). The service experience score may then be generated at least partly using the measured time between the start and end of such a user service experience, and stored in a database (block 408 of FIG. 4) associated with the merchant physical location 100.

While a few examples of individual service events, as well as various examples of the start/end of various user service experiences, have been described, one of skill in the art in possession of the present disclosure will recognize that a wide variety of service events and user service experiences, occurring at variety of times, may be determined while remaining within the scope of the present disclosure. Moreover, while the above examples have been described primarily in the context of a casual or fine-dining restaurant with table service, one of skill in the art in possession of the present disclosure will recognize that embodiments of the present disclosure may be equally employed in fast-food restaurants, cafes, coffee houses, diners, pubs, as well as merchant physical locations and points of interest such as a department/grocery store, a pharmacy, a movie theater, a theme park, a sports stadium, among others, while remaining within the scope of the present disclosure.

In some embodiments, the generation of the service experience score may include a number or grade that is based on the time the user spent receiving the service, details of the service, an employee that provided the service, a date/time of the service, and/or a variety of other service factors known in the art. As such, the service experience score may depend not just on a time period that passed while the service was received, but may be modified based on what the customer ordered, the experience of the employee that provided the service, whether the service was provided during a typically slow or busy period, and/or any other factors that allow the service experience score to be an accurate indication of the service that was provided to the customer. Using these factors in addition to the time necessary to provide the service allows the service experience score to be normalized for a variety of different service scenarios.

Referring now to FIGS. 6*l* and 6*m*, and as discussed above, the operation of the service experience score system may include providing a map of the merchant physical location 100 that may include indications of each of the bar area 108, the to-go area 110, the table seating area 112, the large booth seating area 114, the small booth seating area 116, or other areas in accordance with various merchant physical locations. Moreover, service experience scores associated with each such area and/or other characteristics or features of these areas may be provided to the system provider device. For example, in some embodiments as shown in FIG. 6*l*, scores for each of the various areas in the merchant physical location interior 104 may be mapped by using different patterns, shadings, and/or colors, allowing for a quick service experience score comparison among the various areas (e.g., green areas to indicate relatively fast service areas, red areas to indicate relatively slow areas, etc.). Alternatively, in other embodiments as shown in FIG. 6*m*, specific tables/booths/bar stools/benches within each of the various areas in the merchant physical location interior 104 may be mapped by using different patterns, shadings, and/or colors according to the service experience scores for each individual table/booth/bar stool/bench, thus allowing for a more detailed view of the service experience score for specific locations within the merchant physical location.

In embodiments where the service experience scores are associated with employees at the merchant physical location, the mapping may allow for the selection of particular employees to allow for a determination to be made as to how different employees affect the service experience score of a particular area or section of the merchant physical location. Such employee information (employee schedules) may also be pushed to customer devices to provide for employee specific service experience score mapping across a merchant physical location that allows the customer to see service experience scores that are based on the employees that are working at the merchant physical location the same time the customer is visiting the merchant physical location.

In embodiments where the service experience scores are associated with items ordered at the merchant physical location, the mapping may allow for the selection of particular item or items to allow for a determination to be made as to how different item orders will affect the service experience score of a particular area or section of the merchant physical location. The mapping may allow the customer to input an order of a plurality of items and then have a service experience score indicate a time that it will take to receive those items, which allows the customer to determine if they have time (or are willing to wait) for a particular item or items. While a few examples of mapping the user service experience score to the merchant physical location 100 have been described, one of skill in the art in possession of the present disclosure will recognize that a wide variety of map types and configurations may be used while staying within the scope of the present disclosure.

Thus, a customer 601 may visit the merchant physical location 100 and select an area of the merchant physical location based on the user service experience score for that area, as determined by a plurality of previous customer service experiences sitting in that area. Moreover, the customer 601 may also use the user service experience score prior to visiting the merchant physical location 100 to decide whether the customer would like to visit that merchant physical location relative to other merchant physical locations (e.g., based on their relative service experience scores).

In some embodiments, service experience scores may be associated with times (e.g., an average time) that are associated with receiving service at a particular location. For example, a service experience score associated with a merchant physical location may provide an average time that is typical for customers receiving service at that merchant physical location, and customers may use service experience scores to determine whether they have time (or would be willing to wait the indicated time) to go to a particular merchant physical location, or choose between merchant physical locations based on the time associated with their respective service experience scores. As such, customers may use the service experience scores prior to visiting the merchant physical location 100 to plan a schedule (e.g. allocating the time associated with the service experience score to the schedule for a visit to the merchant physical location). As discussed above, a merchant at a merchant physical location may likewise utilize the user service experience score, for example, to improve business operations and customer service (e.g., to aid in the seating of guests at a restaurant), to determine which areas of the merchant physical location (or employees in the merchant physical location) need help in increasing their service experience score, to determine which employees may be better to schedule for a busy night, etc.

Thus, systems and methods for providing a user service experience score have been described that provide customers at a merchant physical location access to service experience scores that indicate times associated with being seated at a restaurant, placing an order, receiving an order, paying for an order, leaving the restaurant, leaving the parking area, and/or a variety of other service experience events known in the art. The user service experience score and related service experience score data 506b (FIG. 5) may be utilized by the customer to quickly determine a restaurant to visit, an optimal place to sit in a restaurant (i.e., having the shortest service wait time), an overall time required for a visit to a particular merchant location, a wait time to be seated, a wait time for ordering a specific menu item while sitting at a particular location within the restaurant, and/or a variety of other wait times known in the art. Such systems and methods provide improvements over conventional systems for providing wait times that are often inaccurate and are at best a rough estimate. While the systems and methods discussed above have been described as being used by customers of a merchant at a merchant physical location, one of skill in the art in possession of the present disclosure will recognize that the systems and methods discussed herein may be used by employees of the merchant to provide similar benefits to those discussed above that are provided to the customers.

Figure 8:
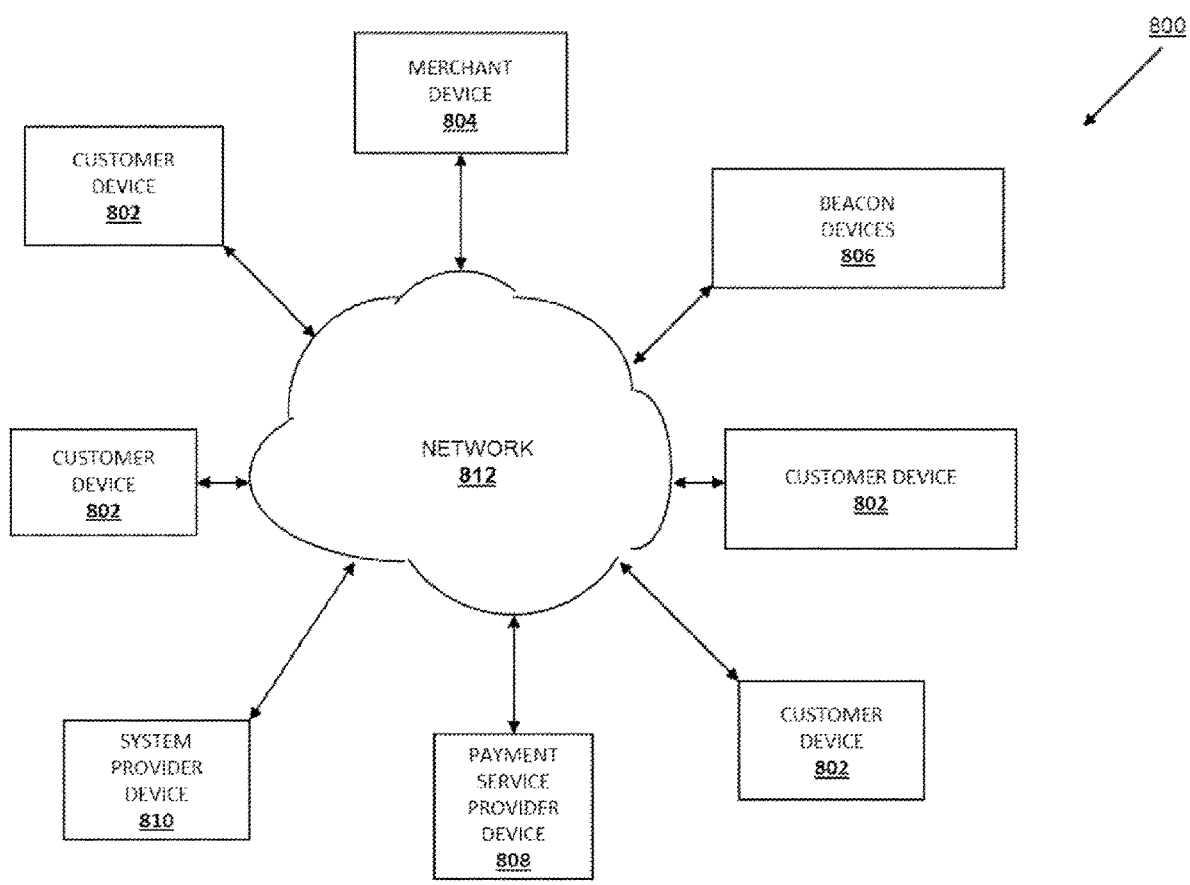
FIG. 8 is a schematic view illustrating an embodiment of a networked system.

Referring now to FIG. 8, an embodiment of a network-based system 800 for implementing one or more processes described herein is illustrated. As shown, the network-based system 800 may comprise or implement a plurality of servers and/or software components that operate to perform various methodologies in accordance with the described embodiments. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 8 may be deployed in other ways and that the operations performed and/or the services provided by such servers may be combined or separated for a given implementation and may be performed by a greater number or fewer number of servers. One or more servers may be operated and/or maintained by the same or different entities.

The embodiment of the networked system 800 illustrated in FIG. 8 includes a plurality of customer devices 802, a merchant device 804, a plurality of beacon devices 806, a payment service provider device 808, and/or a system provider device 810 in communication over one or more networks 812. The customer devices 802 may be the customer devices discussed above and may be operated by the customers discussed above. The merchant devices 804 and beacon devices 806 may be the merchant devices and beacon devices discussed above and may be operated by the merchants discussed above. The payment service provider device 808 may be the payment service provider devices discussed above and may be operated by a payment service provider such as, for example, PayPal Inc. of San Jose, Calif. The system provider devices 810 may be the system provider devices discussed above and may be operated by the system providers discussed above.

The customer devices 802, merchant device 804, beacon devices 806, payment service provider device 808, and/or system provider device 810 may each include one or more processors, memories, and other appropriate components for executing instructions such as program code and/or data stored on one or more computer readable mediums to implement the various applications, data, and steps described herein. For example, such instructions may be stored in one or more computer readable mediums such as memories or data storage devices internal and/or external to various components of the system 800, and/or accessible over the network 812.

The network 812 may be implemented as a single network or a combination of multiple networks. For example, in various embodiments, the network 812 may include the Internet and/or one or more intranets, landline networks, wireless networks, and/or other appropriate types of networks.

The customer devices 802 may be implemented using any appropriate combination of hardware and/or software configured for wired and/or wireless communication over network 812. For example, in one embodiment, the customer devices 802 may be implemented as a personal computer of a user in communication with the Internet. In other embodiments, the customer devices 802 may be a smart phone, personal digital assistant (PDA), laptop computer, and/or other types of computing devices.

The customer devices 802 may include one or more browser applications which may be used, for example, to provide a convenient interface to permit the customer to browse information available over the network 812. For example, in one embodiment, the browser application may be implemented as a web browser configured to view information available over the Internet.

The customer devices 802 may also include one or more toolbar applications which may be used, for example, to provide user-side processing for performing desired tasks in response to operations selected by the customer. In one embodiment, the toolbar application may display a user interface in connection with the browser application.

The customer devices 802 may further include other applications as may be desired in particular embodiments to provide desired features to the customer devices 802. In particular, the other applications may include a payment application for payments assisted by a payment service provider through the payment service provider device 808. The other applications may also include security applications for implementing user-side security features, programmatic user applications for interfacing with appropriate application programming interfaces (APIs) over the network 812, or other types of applications. Email and/or text applications may also be included, which allow customer payer to send and receive emails and/or text messages through the network 812. The customer devices 802 includes one or more user and/or device identifiers which may be implemented, for example, as operating system registry entries, cookies associated with the browser application, identifiers associated with hardware of the customer devices 802, or other appropriate identifiers, such as a phone number. In one embodiment, the user identifier may be used by the payment service provider device 808 to associate the user with a particular account as further described herein.

The merchant device 804 may be maintained, for example, by a conventional or on-line merchant, conventional or digital goods seller, individual seller, and/or application developer offering various products and/or services in exchange for payment to be received conventionally or over the network 812. In this regard, the merchant device 804 may include a database identifying available products and/or services (e.g., collectively referred to as items) which may be made available for viewing and purchase by the customer.

The merchant device 804 also includes a checkout application which may be configured to facilitate the purchase by the payer of items. The checkout application may be configured to accept payment information from the user through the customer devices 802 and/or from the payment service provider through the payment service provider device 808 over the network 812.

Figure 9:
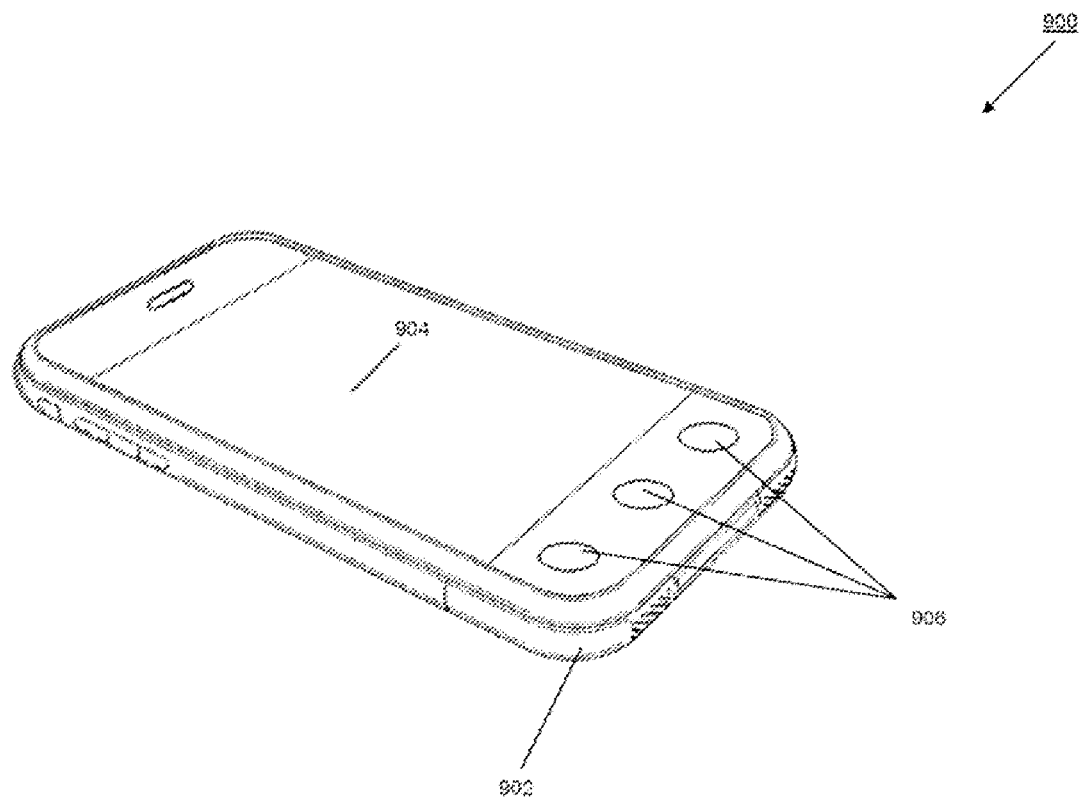
FIG. 9 is a perspective view illustrating an embodiment of a customer device.

Referring now to FIG. 9, an embodiment of a customer device 900 is illustrated. The customer device 900 may be the customer devices 700 or 802 discussed above. The customer device 900 includes a chassis 902 having a display 904 and an input device including the display 904 and a plurality of input buttons 906. One of skill in the art will recognize that the customer device 900 is a portable or mobile phone including a touch screen input device and a plurality of input buttons that allow the functionality discussed above with reference to the methods above. However, a variety of other portable/mobile customer devices and/or desktop customer devices may be used in the methods discussed above without departing from the scope of the present disclosure.

Figure 10:
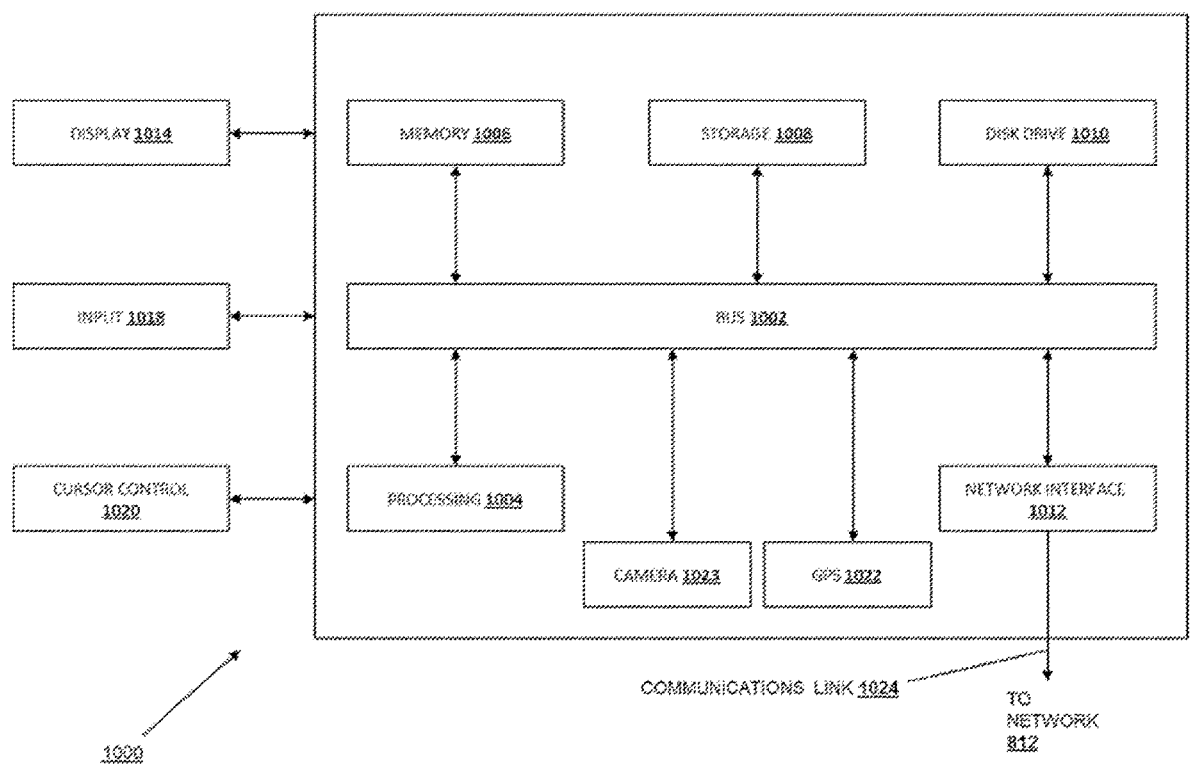
FIG. 10 is a schematic view illustrating an embodiment of a computer system.

Referring now to FIG. 10, an embodiment of a computer system 1000 suitable for implementing, for example, the customer devices 700 or 802, merchant device 804, beacon devices 200, 504, or 806, payment service provider device 808, and/or system provider devices 502 or 810, is illustrated. It should be appreciated that other devices utilized by customers, merchants, beacon devices, merchant beacon communication devices, payment service providers, and/or system providers in the system discussed above may be implemented as the computer system 1000 in a manner as follows.

In accordance with various embodiments of the present disclosure, computer system 1000, such as a computer and/or a network server, includes a bus 1002 or other communication mechanism for communicating information, which interconnects subsystems and components, such as a processing component 1004 (e.g., processor, micro-controller, digital signal processor (DSP), etc.), a system memory component 1006 (e.g., RAM), a static storage component 1008 (e.g., ROM), a disk drive component 1010 (e.g., magnetic or optical), a network interface component 1012 (e.g., modem or Ethernet card), a display component 1014 (e.g., CRT or LCD), an input component 1018 (e.g., keyboard, keypad, or virtual keyboard), a cursor control component 1020 (e.g., mouse, pointer, or trackball), a location determination component 1022 (e.g., a Global Positioning System (GPS) device as illustrated, a cell tower triangulation device, and/or a variety of other location determination devices known in the art), and/or a camera component 1023. In one implementation, the disk drive component 1010 may comprise a database having one or more disk drive components.

In accordance with embodiments of the present disclosure, the computer system 1000 performs specific operations by the processor 1004 executing one or more sequences of instructions contained in the memory component 1006, such as described herein with respect to the customer devices 802, merchant device 804, beacon devices 806, payment service provider device 808, and/or system provider device 810. Such instructions may be read into the system memory component 1006 from another computer readable medium, such as the static storage component 1008 or the disk drive component 1010. In other embodiments, hard-wired circuitry may be used in place of or in combination with software instructions to implement the present disclosure.

Logic may be encoded in a computer readable medium, which may refer to any medium that participates in providing instructions to the processor 1004 for execution. Such a medium may take many forms, including but not limited to, non-volatile media, volatile media, and transmission media.

In one embodiment, the computer readable medium is non-transitory. In various implementations, non-volatile media includes optical or magnetic disks, such as the disk drive component 1010, volatile media includes dynamic memory, such as the system memory component 1006, and transmission media includes coaxial cables, copper wire, and fiber optics, including wires that comprise the bus 1002. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the present disclosure, execution of instruction sequences to practice the present disclosure may be performed by the computer system 1000. In various other embodiments of the present disclosure, a plurality of the computer systems 1000 coupled by a communication link 1024 to the network 812 (e.g., such as a LAN, WLAN, PTSN, and/or various other wired or wireless networks, including telecommunications, mobile, and cellular phone networks) may perform instruction sequences to practice the present disclosure in coordination with one another.

The computer system 1000 may transmit and receive messages, data, information and instructions, including one or more programs (i.e., application code) through the communication link 1024 and the network interface component 1012. The network interface component 1012 may include an antenna, either separate or integrated, to enable transmission and reception via the communication link 1024. Received program code may be executed by processor 1004 as received and/or stored in disk drive component 1010 or some other non-volatile storage component for execution.

Figure 11:
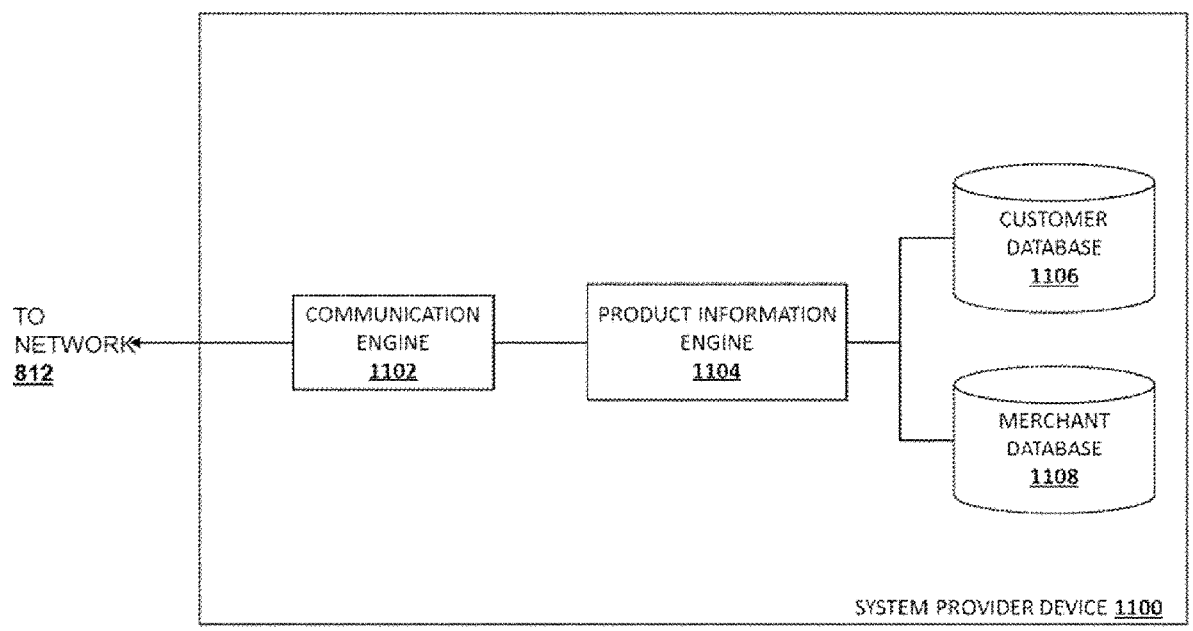
FIG. 11 is a schematic view illustrating an embodiment of a system provider device.

Referring now to FIG. 11, an embodiment of a system provider device 1100 is illustrated. In an embodiment, the device 1100 may be the system provider devices discussed above. The device 1100 includes a communication engine 1102 that is coupled to the network 812 and to a product information engine 1104 that is coupled to a customer information database 1106 and a merchant information database 1108. The communication engine 1102 may be software or instructions stored on a computer-readable medium that allows the device 1100 to send and receive information over the network 812. The product information engine 1104 may be software or instructions stored on a computer-readable medium that is operable to update product information at the merchant physical location, receive product identifiers, determine product identifiers, retrieve product information using a product identifier, provide product information for display on a customer device, as well as provide any of the other functionality that is discussed above. While the databases 1106 and 1108 have been illustrated as located in the device 1100, one of skill in the art will recognize that it may be connected to the product information engine 1104 through the network 812 without departing from the scope of the present disclosure.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. For example, the above embodiments have focused on merchants and customers; however, a customer or consumer can pay, or otherwise interact with any type of recipient, including charities and individuals. The payment does not have to involve a purchase, but may be a loan, a charitable contribution, a gift, etc. Thus, merchant as used herein can also include charities, individuals, and any other entity or person receiving a payment from a customer. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A method, comprising:
   receiving a first sensor signal from a first beacon device using a wireless communication protocol, wherein the first sensor signal is based on a communication between the first beacon device and a user device using the wireless communication protocol, and wherein the first beacon device is associated with a first wireless coverage area;
   determining, by at least one processor, a start of a user service experience based at least in part on receiving the first sensor signal, wherein the first sensor signal from the first beacon device defines a first communication area that corresponds to the first wireless coverage area;
   receiving a second sensor signal from a second beacon device using the wireless communication protocol, wherein the second sensor signal is based on a communication between the second beacon device and the user device using the wireless communication protocol, and wherein the second beacon device is associated with a second wireless coverage area;
   determining, based at least in part on the second sensor signal, that a first service event has occurred after the start of the user service experience;
   determining an end of the user service experience based upon a break in communication between the user device and the first beacon device, wherein the break in communication indicates that the user device has left the first wireless coverage area; and
generating, in-real time, a first service experience score that is based at least in part on:
the start of the user service experience determined based on the first sensor signal from the first beacon device; and
the end of the user service experience determined based on the break in communication.

2. The method of claim 1, further comprising:
receiving, by the at least one processor from a database, a layout of an environment associated with the user service experience; and
determining, by the at least one processor, a location of the user device relative to the layout of the environment associated with the user service experience, wherein determining the start of the user service experience is based at least in part on the location of the user device relative to the layout of the environment associated with the user service experience.

3. The method of claim 2, wherein the end of the user service experience is determined by:
identifying, by the at least one processor, the location of the user device relative to one or more boundaries of the layout of the environment associated with the user service experience.

4. The method of claim 1, further comprising:
receiving, by the at least one processor, one or more inputs from the user device, wherein generating the first service experience score is based at least in part on the one or more inputs from the user device.

5. The method of claim 1, further comprising:
determining, by the at least one processor, a first duration between the start of the user service experience and the first service event, a second duration between the first service event and the end of the user service experience, or both, wherein the first service experience score is generated based at least in part on the first duration, the second duration, or both.

6. The method of claim 1, further comprising:
identifying, by the at least one processor, a plurality of historical service experience scores stored to a database based at least in part on generating the first service experience score;
aggregating the first service experience score with the plurality of historical service experience scores; and
causing display, at a second user device, an aggregated service experience score based at least in part on aggregating the first service experience score with the plurality of historical service experience scores.

7. The method of claim 1, further comprising:
determining, by the at least one processor, a first location of the user device based at least in part on the first sensor signal and the second sensor signal, wherein generating the first service experience score is further based at least in part on the first location of the user device.

8. The method of claim 7, further comprising:
associating the first service experience score with a second location that is a sub-location of the first location.

9. A system, comprising:
one or more processors; and
a memory storing instructions which, when executed by the one or more processors, cause the system to perform operations comprising:
receiving a first sensor signal from a first beacon device using a wireless communication protocol, wherein the first sensor signal is based on a communication between the first beacon device and a user device using the wireless communication protocol, and wherein the first beacon device is associated with a first wireless coverage area;
determining a start of a user service experience based at least in part on receiving the first sensor signal, wherein the first sensor signal from the first beacon device defines a first communication area that corresponds to the first wireless coverage area;
receiving a second sensor signal from a second beacon device using the wireless communication protocol, wherein the second sensor signal is based on a communication between the second beacon device and the user device using the wireless communication protocol, and wherein the second beacon device is associated with a second wireless coverage area;
determining, based at least in part on the second sensor signal, that a first service event has occurred after the start of the user service experience;
determining an end of the user service experience based upon a break in communication between the user device and the first beacon device, wherein the break in communication indicates that the user device has left the first wireless coverage area; and
generating, in-real time, a first service experience score that is based at least in part on:
the start of the user service experience determined based on the first sensor signal from the first beacon device; and
the end of the user service experience determined based on the break in communication.

10. The system of claim 9, wherein the instructions, when executed by the one or more processors, cause the system to perform operations comprising:
receiving, from a database, a layout of an environment associated with the user service experience; and
determining a location of the user device relative to the layout of the environment associated with the user service experience, wherein determining the start of the user service experience is based at least in part on the location of the user device relative to the layout of the environment associated with the user service experience.

11. The system of claim 10, wherein the end of the user service experience is determined by:
identifying the location of the user device relative to one or more boundaries of the layout of the environment associated with the user service experience.

12. The system of claim 9, wherein the instructions, when executed by the one or more processors, cause the system to perform operations comprising:
receiving one or more inputs from the user device, wherein generating the first service experience score is based at least in part on the one or more inputs from the user device.

13. The system of claim 9, wherein the instructions, when executed by the one or more processors, cause the system to perform operations comprising:
determining a first duration between the start of the user service experience and the first service event, a second duration between the first service event and the end of the user service experience, or both, wherein the first service experience score is generated based at least in part on the first duration, the second duration, or both.

14. The system of claim 9, wherein the instructions, when executed by the one or more processors, cause the system to perform operations comprising:

identifying a plurality of historical service experience scores stored to a database based at least in part on generating the first service experience score;

aggregating the first service experience score with the plurality of historical service experience scores; and causing display, at a second user device, an aggregated service experience score based at least in part on aggregating the first service experience score with the plurality of historical service experience scores.

15. The system of claim 9, wherein the instructions, when executed by the one or more processors, cause the system to perform operations comprising:

determining a first location of the user device based at least in part on the first sensor signal and the second sensor signal, wherein generating the first service experience score is further based at least in part on the first location of the user device.

16. The system of claim 15, wherein the instructions, when executed by the one or more processors, cause the system to perform operations comprising:

associating the first service experience score with a second location that is a sub-location of the first location.

17. A non-transitory computer-readable medium storing executable instructions which, when executed by one or more processors of a server, cause the server to perform operations comprising:

receiving a first sensor signal from a first beacon device using a wireless communication protocol, wherein the first sensor signal is based on a communication between the first beacon device and a user device using the wireless communication protocol, and wherein the first beacon device is associated with a first wireless coverage area;

determining a start of a user service experience based at least in part on receiving the first sensor signal, wherein the first sensor signal from the first beacon device defines a first communication area that corresponds to the first wireless coverage area;

receiving a second sensor signal from a second beacon device using the wireless communication protocol, wherein the second sensor signal is based on a communication between the second beacon device and the user device using the wireless communication protocol, and wherein the second beacon device is associated with a second wireless coverage area;

determining, based at least in part on the second sensor signal, that a first service event has occurred after the start of the user service experience;

determining an end of the user service experience based upon a break in communication between the user device and the first beacon device, wherein the break in communication indicates that the user device has left the first wireless coverage area; and generating, in-real time, a first service experience score that is based at least in part on:

the start of the user service experience determined based on the first sensor signal from the first beacon device; and the end of the user service experience determined based on the break in communication.

18. The computer-readable medium of claim 17, wherein the instructions which, when executed by the one or more processors, cause the server to perform operations comprising:

receiving, from a database, a layout of an environment associated with the user service experience; and determining a location of the user device relative to the layout of the environment associated with the user service experience, wherein determining the start of the user service experience is based at least in part on the location of the user device relative to the layout of the environment associated with the user service experience.

19. The computer-readable medium of claim 18, wherein the end of the user service experience is determined by:

identifying the location of the user device relative to one or more boundaries of the layout of the environment associated with the user service experience.

20. The computer-readable medium of claim 17, wherein the instructions which, when executed by the one or more processors, cause the server to perform operations comprising:

receiving one or more inputs from the user device, wherein generating the first service experience score is based at least in part on the one or more inputs from the user device.

* * * * *